(12) United States Patent
Katsuyama

(10) Patent No.: US 9,973,652 B2
(45) Date of Patent: May 15, 2018

(54) DITHER MASK GENERATION METHOD AND DEVICE

(71) Applicant: FUJIFILM Corporation, Tokyo (JP)

(72) Inventor: Kimito Katsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/267,637

(22) Filed: Sep. 16, 2016

(65) Prior Publication Data
US 2017/0085749 A1 Mar. 23, 2017

(30) Foreign Application Priority Data
Sep. 18, 2015 (JP) .................................. 2015-185380

(51) Int. Cl.
*H04N 1/40* (2006.01)
*H04N 1/405* (2006.01)
*H04N 1/52* (2006.01)

(52) U.S. Cl.
CPC ............. *H04N 1/4051* (2013.01); *H04N 1/52* (2013.01)

(58) Field of Classification Search
USPC ....... 358/3.13–3.19, 3.06, 3.3, 502, 534–536
See application file for complete search history.

(56) References Cited

U.S. PATENT DOCUMENTS

| | | | |
|---|---|---|---|
| 2007/0153333 A1* | 7/2007 | Kakutani | H04N 1/4051 358/3.13 |
| 2007/0258110 A1* | 11/2007 | Kakutani | H04N 1/4051 358/3.16 |
| 2010/0177137 A1 | 7/2010 | Kakutani | |
| 2016/0167376 A1* | 6/2016 | Katsuyama | G06K 15/107 347/15 |
| 2016/0191747 A1* | 6/2016 | Katsuyama | H04N 1/52 358/3.13 |
| 2017/0013165 A1* | 1/2017 | Katsuyama | B41J 2/2054 |
| 2017/0085750 A1* | 3/2017 | Katsuyama | H04N 1/52 |
| 2017/0157919 A1* | 6/2017 | Katsuyama | B41J 2/04508 |

FOREIGN PATENT DOCUMENTS

JP 2010-162770 A 7/2010

* cited by examiner

*Primary Examiner* — Barbara Reinier
(74) *Attorney, Agent, or Firm* — Studebaker & Brackett PC

(57) ABSTRACT

The dither mask generation method includes: a process of setting a nozzle pattern indicating correspondence relation between individual pixels of the dither mask and the nozzles in charge of recording of respective pixel positions; a process of setting dot priority pixels to be candidates of a pixel to set a threshold among the pixels of the dither mask, based on the nozzle pattern; a process of setting the threshold to the pixel belonging to the dot priority pixels; and a process of changing the dot priority pixels before the threshold is set to all the dot priority pixels tentatively set by the dot priority pixel setting process regarding at least some thresholds.

15 Claims, 23 Drawing Sheets

| NOZZLE NUMBER | NOZZLE RELATIVE EJECTION RATE | NUMBER OF DOT PRIORITY PIXELS |
|---|---|---|
| 0 | 0.2 | 3.6 |
| 5 | 0.8 | 14.4 |
| 1 | 0.4 | 7.2 |
| 6 | 0.6 | 10.8 |
| 2 | 0.6 | 10.8 |
| 7 | 0.4 | 7.2 |
| 3 | 0.8 | 14.4 |
| 8 | 0.2 | 3.6 |
| 4 | 1 | 18 |
| 0 | 0.2 | 3.6 |
| 5 | 0.8 | 14.4 |
| 1 | 0.4 | 7.2 |
| 6 | 0.6 | 10.8 |
| 2 | 0.6 | 10.8 |
| 7 | 0.4 | 7.2 |
| 3 | 0.8 | 14.4 |
| 8 | 0.2 | 3.6 |
| 4 | 1 | 18 |

| LEFT NOZZLE RELATIVE EJECTION RATE | RIGHT NOZZLE RELATIVE EJECTION RATE | NUMBER OF LEFT NOZZLE PRIORITY PIXELS | NUMBER OF RIGHT NOZZLE PRIORITY PIXELS |
|---|---|---|---|
| 1 | 0.2 | 10 | 2 |
| 0.4 | 0.8 | 4 | 8 |
| 0.8 | 0.4 | 8 | 4 |
| 0.2 | 1 | 2 | 10 |
| 0.6 | 0.6 | 6 | 6 |
| 0.2 | 1 | 2 | 10 |
| 0.4 | 0.8 | 4 | 8 |
| 0.4 | 0.8 | 4 | 8 |
| 0.2 | 1 | 2 | 10 |
| 0.6 | 0.6 | 6 | 6 |
| 0.2 | 1 | 2 | 10 |
| 0.8 | 0.4 | 8 | 4 |
| 0.4 | 0.8 | 4 | 8 |
| 1 | 0.2 | 10 | 2 |
| 0.6 | 0.6 | 6 | 6 |
| 1 | 0.2 | 10 | 2 |
| 0.8 | 0.4 | 8 | 4 |
| 0.8 | 0.4 | 8 | 4 |
| 1 | 0.2 | 10 | 2 |
| 0.6 | 0.6 | 6 | 6 |

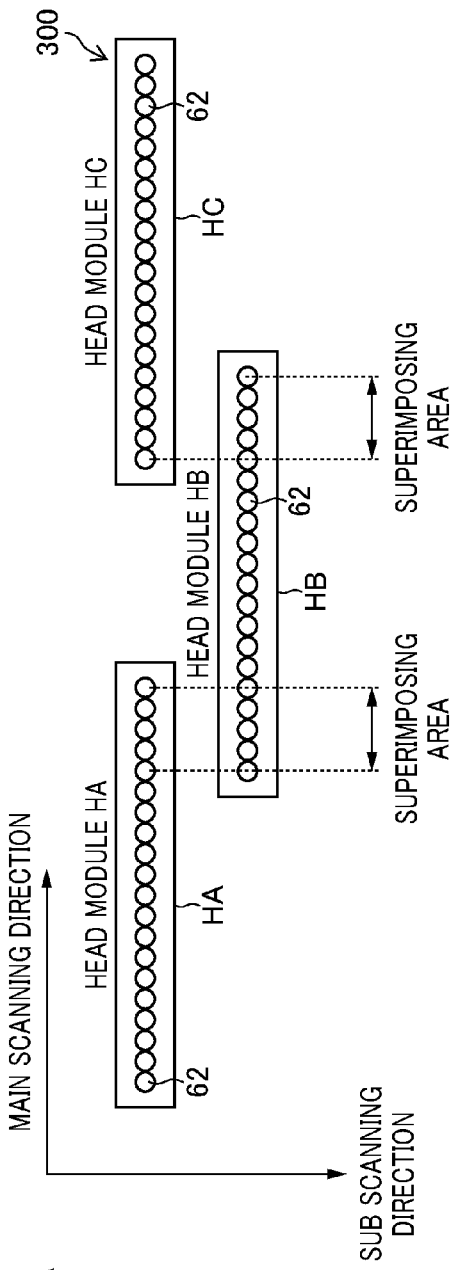
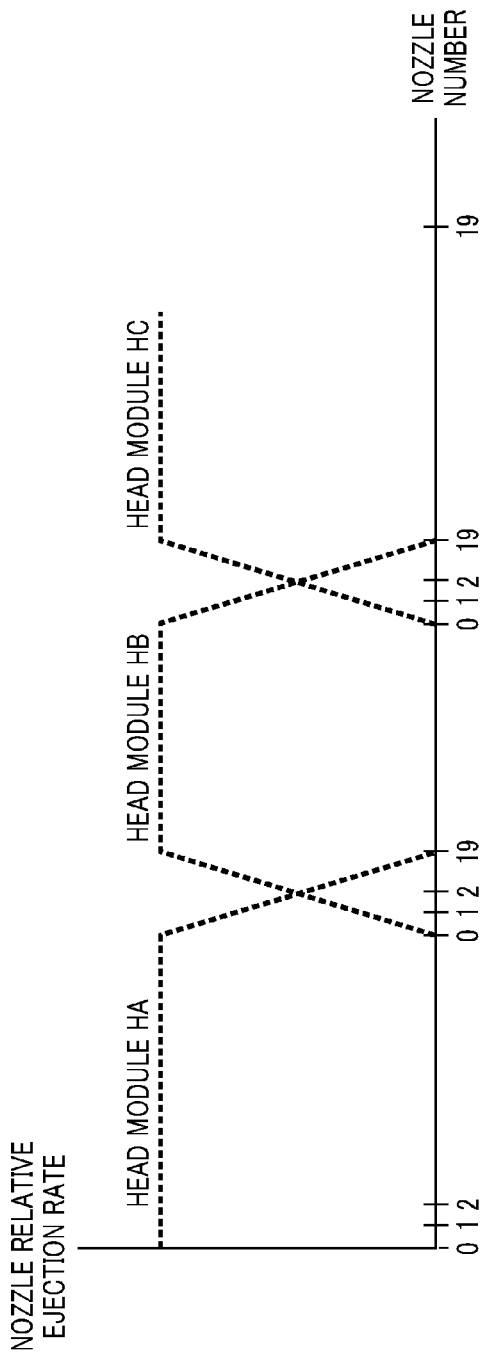
FIG.26A
FIG.26B

DITHER MASK GENERATION METHOD AND DEVICE

CROSS-REFERENCE TO RELATED APPLICATIONS

The present application claims priority under 35 U.S.C. § 119 to Japanese Patent Application No. 2015-185380, filed on Sep. 18, 2015. The above application is hereby expressly incorporated by reference, in its entirety, into the present application.

BACKGROUND OF THE INVENTION

Field of the Invention

The present invention relates to a dither mask generation method and device, and in particular relates to a technology of generating a dither mask used in halftone processing utilized in ink ejection control of an inkjet printer.

Description of the Related Art

Japanese Patent Application Laid-Open No. 2010-162770 gazette discloses a serial type inkjet printer that controls ejection of each nozzle of a print head by performing halftone processing by an ordered dither method using a dither mask. The serial type inkjet printer records images on a recording medium by repeating a scan operation of ejecting ink from a nozzle of a print head while moving the print head along a main scanning direction and a medium conveying operation which is sub scanning feed of intermittently conveying the recording medium in a sub scanning direction.

In such a recording method, behavior of impacted droplets on a recording medium, that is, dot behavior, is changed by recording position errors of individual dots to the recording medium by individual nozzles of a print head, ejection amount errors of the individual nozzles, a recording order or recording timing of dots or the like. Due to the change of the dot behavior on the recording medium, density irregularity called "banding" in which a recording density changes in a repetition cycle of individual print paths, a boundary of the individual print paths is conspicuous or the like is generated. When banding is generated, a problem that print image quality declines arises.

For such a problem, in the printer described in Japanese Patent Application Laid-Open No. 2010-162770 gazette, banding is suppressed by setting a threshold of the dither mask such that a nozzle using rate of at least one of nozzle groups (including most distal end nozzles arranged at both individual ends) arranged at each of both ends of a nozzle array of the print head becomes lower than a nozzle using rate of an intermediate nozzle group arranged between the nozzle groups at both ends. Japanese Patent Application Laid-Open No. 2010-162770 gazette discloses a method of generating a dither mask that makes a dot density of pixels recorded by the nozzle groups at both ends of the nozzle array lower than a dot density of pixels recorded by the intermediate nozzle group to suppress banding.

It is understood that "print head" in Japanese Patent Application Laid-Open No. 2010-162770 gazette is a term corresponding to "recording head" in the present specification. Also, it is understood that "nozzle using rate" in Japanese Patent Application Laid-Open No. 2010-162770 gazette is a term corresponding to "nozzle ejection rate" in the present specification.

SUMMARY OF THE INVENTION

In a dither mask generation method disclosed in Japanese Patent Application Laid-Open No. 2010-162770 gazette, when generating a dither mask, a dot suppression pixel which is a pixel that lowers a priority order of dot formation by a predetermined rate (nozzle using rate) is set to a pixel corresponding to a distal end nozzle first. Then, thresholds are optimally arranged for dot priority pixels which are pixels excluding the dot suppression pixels among the entire pixels of the dither mask first. Thereafter, the thresholds are optimally arranged for the dot suppression pixels (paragraph 0045 in Japanese Patent Application Laid-Open No. 2010-162770 gazette). By using the dither mask generated in such a manner, formation of dots can be controlled so that the using rate of the distal end nozzle becomes a target predetermined value.

However, the dither mask generation method disclosed in Japanese Patent Application Laid-Open No. 2010-162770 gazette has a problem that graininess is deteriorated at an intermediate duty to a high duty compared to a method of generating a dither mask without setting the dot suppression pixels or the dot priority pixels. That is, the graininess of a dot arrangement in which dots are formed at all the dot priority pixels by the method of Japanese Patent Application Laid-Open No. 2010-162770 gazette is substantially deteriorated compared to a dot arrangement in which the same number (same duty) of dots are formed without setting the dot priority pixels. "Duty" is a ratio of pixels to be dot-on in the individual pixels of an image to be recorded on a recording medium. The duty is sometimes called by a term such as a printing duty, a recording duty, an ink duty, a printing rate or a recording rate.

In the case of a low duty, since the thresholds can be optimally arranged relatively freely even within a range of an arrangement restriction of the dot priority pixels, the dot arrangement with excellent graininess can be realized. On the other hand, at the intermediate duty to the high duty at which the arrangement of the thresholds becomes close to the arrangement of the dot priority pixels, since a degree of freedom of the threshold arrangement declines, the graininess is rapidly deteriorated (graph [2] in FIG. 24).

This problem is generated similarly in the case of regularly setting the dot priority pixels or in the case of irregularly (randomly, for example) setting the dot priority pixels. The above-described problem can be solved by setting the dot priority pixels or the dot suppression pixels that make the graininess of the dot arrangement in which the dot is formed at the dot priority pixel or the dot arrangement in which the dot is formed at the dot suppression pixel be excellent, however, it is difficult to obtain such an arrangement of the dot priority pixels beforehand.

Also, even if the arrangement of the dot priority pixels with excellent graininess can be obtained beforehand and set, when continuity of the arrangement of the dot priority pixels and the arrangement of the thresholds to be set according to a method of setting the threshold of the dither mask is not good, the graininess is also deteriorated as the number of the thresholds approaches the number of the dot priority pixels.

The present invention is implemented in consideration of such a situation, and an object is to provide a dither mask generation method and device capable of generating a dither mask that can form dots at a target nozzle ejection rate and can improve graininess compared to a conventional method.

To solve the problem, the following invention aspects are provided.

A dither mask generation method relating to a first aspect is a method of generating a dither mask used in halftone processing for recording an image by a recording head having a plurality of nozzles that eject ink, and the dither mask generation method includes: a nozzle pattern setting process of setting a nozzle pattern indicating correspondence relation between individual pixels of the dither mask and the nozzles in charge of recording of respective pixel positions; a dot priority pixel setting process of setting dot priority pixels to be candidates of a pixel to set a threshold among the pixels of the dither mask; a threshold setting process of setting the threshold to the pixel belonging to the dot priority pixels; and a process of changing the dot priority pixels before the threshold is set to each of all the dot priority pixels tentatively set by the dot priority pixel setting process regarding at least some thresholds.

According to the first aspect, when setting the threshold to the dither mask, the dot priority pixels are set reflecting the nozzle pattern, and the threshold is set to the pixel belonging to the dot priority pixels. Then, before setting the threshold to all the dot priority pixels that are tentatively set, the dot priority pixels are changed, and the threshold is set to the pixel belonging to the changed dot priority pixels. By changing the dot priority pixels and setting the threshold in this way, a restriction of the threshold arrangement is mitigated, and the dither mask with excellent graininess compared to a conventional method can be generated.

"Before setting the threshold to all the dot priority pixels that are tentatively set, the dot priority pixels are changed" means that the dot priority pixels are changed in a state that the threshold is not set to at least some pixels among the dot priority pixels that are tentatively set.

As a second aspect, in the dither mask generation method of the first aspect, the configuration can be such that the method includes a priority pixel setting rate setting process of setting a priority pixel setting rate that indicates a ratio of the dot priority pixels in recording attending pixels allocated to each nozzle as pixels for which each of the plurality of nozzles is in charge of recording among the pixels of the dither mask, and in the dot priority pixel setting process, the dot priority pixels are set based on the nozzle pattern and the priority pixel setting rate for each nozzle.

"Priority pixel setting rate" can be a ratio or the number indicating the ratio of the dot priority pixels in the recording attending pixels allocated to each nozzle. In the case of indicating the priority pixel setting rate by a ratio, for example, it can be defined by a quotient of division, whose denominator is the number of recording attending pixels, and whose numerator is the number of dot priority pixels, that is, "number of dot priority pixels/number of recording attending pixels". Of course, the ratio can be also defined by a percentage. Also, the priority pixel setting rate can be defined by the number of the dot priority pixels. Since the number of the recording attending pixels of each nozzle in the pixels of the dither mask can be specified based on the nozzle pattern, the number of the dot priority pixels of each nozzle corresponds to information indicating the ratio of the dot priority pixels in the recording attending pixels.

The priority pixel setting rate can be determined based on a target nozzle ejection rate. When a relative ratio between the nozzles of nozzle ejection rates of the individual nozzles to be a control target is called "nozzle relative ejection rate", the nozzle relative ejection rate can be used as the priority pixel setting rate. The priority pixel setting rates of the individual nozzles can be appropriately set from a viewpoint of obtaining a banding suppressing effect. The priority pixel setting rate that suppresses banding can be determined according to characteristics of the recording head such as a nozzle array form, image drawing conditions and the like.

The dither mask generated by the dither mask generation method of the second aspect can control the nozzle ejection rates of the individual nozzles to the target nozzle ejection rates, and can effectively suppress banding.

As a third aspect, in the dither mask generation method of the second aspect, the configuration can be such that setting of the priority pixel setting rate for each nozzle set by the priority pixel setting rate setting process is changed in a plurality of stages, at least two stages, by a value of the threshold set by the threshold setting process.

As a fourth aspect, in the dither mask generation method of the third aspect, the configuration can be such that, when a maximum value of a value that the priority pixel setting rate can take is 1.0, the priority pixel setting rates of all the nozzles are 1.0 in the final stage of the plurality of stages.

As a fifth aspect, in the dither mask generation method of the third aspect or the fourth aspect, the configuration can be such that one kind of the dot priority pixels is set to the setting of the priority pixel setting rate of the same stage by the dot priority pixel setting process.

As a sixth aspect, in the dither mask generation method of the third aspect or the fourth aspect, the configuration can be such that a plurality of different kinds of the dot priority pixels are switched and set to the setting of the priority pixel setting rate of the same stage by the dot priority pixel setting process.

As a seventh aspect, in the dither mask generation method of any one aspect of the third aspect to the sixth aspect, the configuration can be such that the number of the thresholds to be set under the setting of the priority pixel setting rate of the same stage is determined, and when the setting of the determined number of the thresholds is completed, change to the setting of the priority pixel setting rate of a different stage is performed.

As an eighth aspect, in the dither mask generation method of any one aspect of the first aspect to the seventh aspect, the configuration can be such that in the dot priority pixel setting process, the dot priority pixels are set using a random number, based on the priority pixel setting rate for each nozzle.

As a ninth aspect, in the dither mask generation method of any one aspect of the first aspect to the eighth aspect, the configuration can be such that the dot priority pixels are set based on the pixels of the thresholds that are already set.

As a tenth aspect, in the dither mask generation method of the ninth aspect, the configuration can be such that in the dot priority pixel setting process, the pixels other than the pixels of the thresholds that are already set are set to the dot priority pixels.

As an eleventh aspect, in the dither mask generation method of any one aspect of the first aspect to the tenth aspect, the configuration can be such that the dot priority pixel setting process includes a process of determining whether or not the pixel to which the threshold is not set is the dot priority pixel.

As a twelfth aspect, in the dither mask generation method of any one aspect of the first aspect to the eleventh aspect, the configuration can be such that the recording head has a nozzle array formed by arraying the nozzles in a sub scanning direction that is parallel to a conveying direction of a recording medium, and is a serial type recording head that records an image on the recording medium while moving in a main scanning direction that is a width direction of the recording medium which intersects with the sub scanning direction.

As a thirteenth aspect, in the dither mask generation method of the twelfth aspect, the configuration can be such that, regarding the priority pixel setting rate that indicates the ratio of the dot priority pixels in the recording attending pixels allocated to each nozzle as the pixels for which each of the plurality of nozzles is in charge of recording among the pixels of the dither mask, the priority pixels are set such that the priority pixel setting rate of the nozzle arranged at an end of the nozzle array becomes a value smaller than the priority pixel setting rate of the nozzle arranged at a center part of the nozzle array.

A dither mask generation device relating to a fourteenth aspect is a device that generates a dither mask used in halftone processing for recording an image by a recording head having a plurality of nozzles that eject ink, the dither mask generation device includes: a nozzle pattern setting unit that sets a nozzle pattern indicating correspondence relation between individual pixels of the dither mask and the nozzles in charge of recording of respective pixel positions; a dot priority pixel setting unit that sets dot priority pixels to be candidates of a pixel to set a threshold among the pixels of the dither mask, based on the nozzle pattern; and a threshold setting unit that sets the threshold to the pixel belonging to the dot priority pixels, and the dot priority pixel setting unit changes the dot priority pixels before the threshold is set to all the dot priority pixels that are tentatively set, regarding at least some thresholds.

In the dither mask generation device of the fourteenth aspect, matters similar to specific matters of the dither mask generation method specified in the second aspect to the thirteenth aspect can be appropriately combined. In that case, a process (step) of processing or an operation specified in the dither mask generation method can be recognized as an element of a processing unit or a functional unit as a device in charge of the processing or the operation corresponding thereto.

A fifteenth aspect is a non-transitory and tangible computer-readable recording medium which stores a program for making a computer achieve a function of generating a dither mask used in halftone processing for recording an image by a recording head having a plurality of nozzles that eject ink, such that when the program is read and executed by the computer, the computer is configured to perform: a nozzle pattern setting function of setting a nozzle pattern indicating correspondence relation between individual pixels of the dither mask and the nozzles in charge of recording of respective pixel positions; a dot priority pixel setting function of setting dot priority pixels to be candidates of a pixel to set a threshold among the pixels of the dither mask, based on the nozzle pattern; a threshold setting function of setting the threshold to the pixel belonging to the dot priority pixels; and a function of changing the dot priority pixels before the threshold is set to all the dot priority pixels that are tentatively set by the dot priority pixel setting function, regarding at least some thresholds.

In the program of the fifteenth aspect, matters similar to specific matters of the dither mask generation method specified in the second aspect to the thirteenth aspect can be appropriately combined. In that case, a process (step) of processing or an operation specified in the dither mask generation method can be recognized as an element of "function" of the program that performs the processing or the operation corresponding thereto.

According to the present invention, it is possible to generate a dither mask that can form dots at a target nozzle ejection rate, and it is also possible to generate a dither mask that can improve graininess compared to a conventional method.

BRIEF DESCRIPTION OF THE DRAWINGS

FIG. 13 is a diagram illustrating one example of a nozzle pattern;

FIG. 16 is a diagram illustrating an example of an arrangement of dot priority pixels;

FIG. 22 is a diagram illustrating one example of a nozzle pattern in the fifth embodiment;

FIG. 23 is a diagram illustrating an arrangement example of dot priority pixels in the fifth embodiment;

FIG. 26A is a schematic diagram of a single path type recording head, and FIG. 26B is a graph illustrating the nozzle relative ejection rate of each nozzle of the recording head.

DETAILED DESCRIPTION OF THE EMBODIMENTS

Hereinafter, embodiments of the present invention is described in detail according to the accompanying drawings.

[Configuration Example of Inkjet Recording Device]

Figure 1:
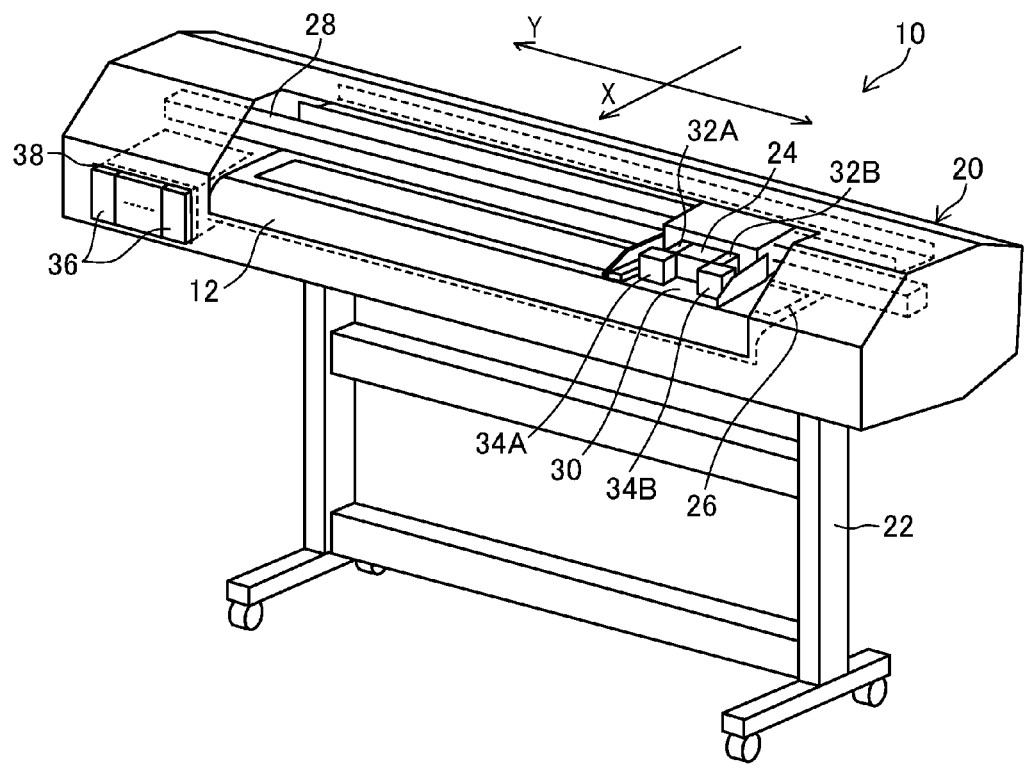
FIG. 1 is an external perspective view illustrating a configuration example of an inkjet recording device.

FIG. 1 is an external perspective view illustrating a configuration example of an inkjet recording device. An inkjet recording device 10 is one example of a serial type inkjet printer, and is a wide format printer that records a color image onto a recording medium 12 using ultraviolet curing type ink. However, in application of the invention, a form of the inkjet recording device is not limited to this example.

The inkjet recording device 10 includes a device body 20, and a support leg 22 that supports the device body 20. The device body 20 is provided with a recording head 24, a platen 26, a guide mechanism 28, and a carriage 30.

The recording head 24 is a drop-on-demand type inkjet head that ejects ink toward the recording medium 12. The term "recording head" has the same meaning as terms such as a print head, a printing head, a drawing head, an ink ejecting head, a liquid ejecting head, a droplet ejecting head, or a droplet jetting head or the like. Also, the term "inkjet recording device" has the same meaning as terms such as an inkjet printing device, an inkjet printing machine, an inkjet printer, or an inkjet type image forming apparatus or the like. "Recording" is used as a term that includes the meaning of print, printing, drawing or image formation.

For the recording medium 12, various media can be used regardless of a material such as paper, nonwoven fabric, vinyl chloride, synthetic chemical fibers, polyethylene, polyester, or tarpaulin. The recording medium 12 may be a permeable medium or may be an impermeable medium. The term "recording medium" is a general term of a medium to which ink is deposited, and includes the ones called by various terms such as a printing medium, a recording target medium, an image formation target medium, an image receiving medium, an ejection target medium, a print medium, recording paper or print paper. The term "paper" in the present specification is used for the same meaning as "recording medium".

The platen 26 is a member that supports the recording medium 12. The guide mechanism 28 and the carriage 30 function as a head moving device that movably supports the recording head 24. The guide mechanism 28 is arranged extending along a head scanning direction which is a direction that intersects with a conveyance direction of the recording medium 12 and is a direction parallel to a medium support surface of the platen 26 at an upper part of the platen 26. The upper part of the platen 26 means a high position on an upper side of the platen 26 with a gravity direction as "lower part". The conveyance direction of the recording medium 12 is sometimes called "paper feed direction". Also, a direction which is orthogonal to the paper feed direction and the direction parallel to a recording surface of the recording medium 12 is sometimes called "paper width direction".

The carriage 30 is supported movably back and forth in the paper width direction along the guide mechanism 28. The direction parallel to the reciprocating moving direction of the carriage 30 corresponds to "main scanning direction". Also, the direction parallel to the conveyance direction of the recording medium 12 corresponds to "sub scanning direction". That is, the paper width direction is the main scanning direction, and the paper feed direction is the sub scanning direction. In FIG. 1, the sub scanning direction is noted as an X direction, and the main scanning direction is noted as a Y direction.

The carriage 30 is loaded with the recording head 24, temporarily curing light sources 32A and 32B, and full curing light sources 34A and 34B. The recording head 24, the temporarily curing light sources 32A and 32B, and the full curing light sources 34A and 34B are integrally moved together with the carriage 30 along the guide mechanism 28. By moving the carriage 30 back and forth in the main scanning direction along the guide mechanism 28, the recording head 24 can be relatively moved in the main scanning direction to the recording medium 12.

The temporarily curing light sources 32A and 32B emit ultraviolet rays for temporarily curing ink impacted onto the recording medium 12. Temporary curing means partial curing of the ink so as to prevent movement and deformation of ink droplets immediately after deposition. A process of the temporary curing is sometimes called "partial curing", "semi-curing", "pinning" or "set" or the like. In the present specification, the term "temporary curing" is used.

On the other hand, a process of further emitting ultraviolet rays and sufficiently curing the ink after the temporary curing is called "full curing" or "curing". In the present specification, the term "full curing" is used. The full curing light sources 34A and 34B are light sources that perform additional exposure after the temporary curing and emit ultraviolet rays for completely curing (that is, fully curing) the ink finally.

The device body 20 is provided with an attaching unit 38 for attaching an ink cartridge 36. The ink cartridge 36 is a freely exchangeable ink tank that stores the ultraviolet curing type ink. The ink cartridge 36 is provided corresponding to the ink of each color used in the inkjet recording device 10. The inkjet recording device 10 of this example is configured to use the ink of four colors that are cyan (C), magenta (M), yellow (Y), and black (K). The individual ink cartridges 36 for the respective colors are connected to the recording head 24 by respectively independently formed ink supply routes not shown in the figure. When an ink residual amount of each color becomes small, the ink cartridge 36 is exchanged.

Though omitted in the figure, on a right side facing the front of the device body 20, a maintenance unit of the recording head 24 is provided. The maintenance unit includes a cap for moisture retention and nozzle suction of the recording head 24 when printing is not performed, and a wiping member for cleaning a nozzle surface which is an ink ejection surface of the recording head 24. For the wiping member, a blade and/or a web can be used.

[Configuration of Recording Medium Conveyance Path]

Figure 2:
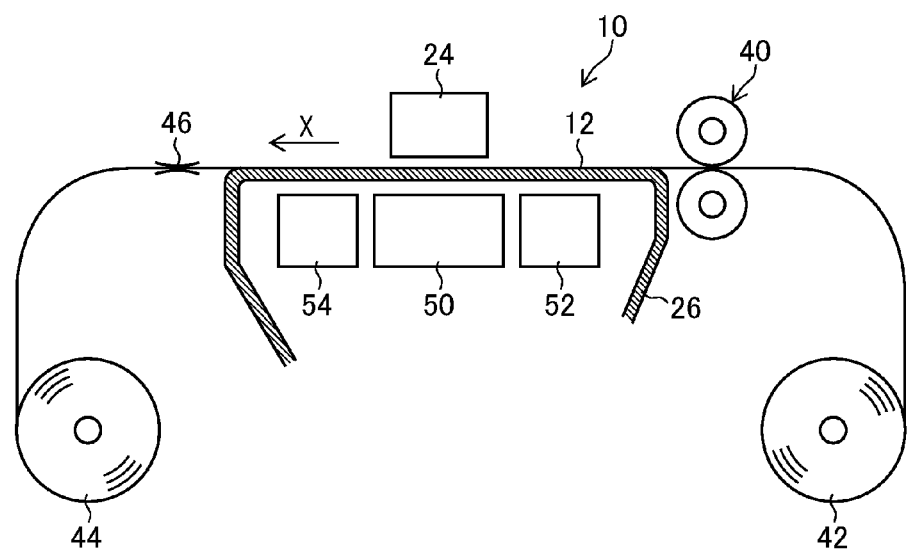
FIG. 2 is a schematic diagram schematically illustrating a recording medium conveyance path of the inkjet recording device.

FIG. 2 is a schematic diagram schematically illustrating a recording medium conveyance path of the inkjet recording device 10. As illustrated in FIG. 2, an upper surface of the platen 26 becomes a support surface of the recording medium 12. A nip roller 40 is disposed on an upstream side of the paper feed direction relative to a position of the platen 26.

The recording medium 12 of this example is supplied in a form of continuous paper (also called web paper) wound in a roll shape. The recording medium 12 sent out from a roll 42 on a supply side is conveyed by the nip roller 40. To the recording medium 12 which arrives at a part right below the recording head 24, an image is recorded by the recording head 24. On a downstream side of the paper feed direction relative to the position of the recording head 24, a winding roll 44 that winds the recording medium 12 after the image is recorded is provided. Also, in the conveyance path of the recording medium 12 between the platen 26 and the winding roll 44, a guide 46 is provided.

In the inkjet recording device 10 of the present embodiment, a roll-to-roll type paper conveyance device by which the recording medium 12 sent out from the roll 42 on the supply side is wound to the winding roll 44 through the platen 26 is adopted. However, in implementing the invention, the configuration of the paper conveyance device is not limited to this example. For example, a form that the winding roll 44 is omitted and a form that has a cutter which cuts the recording medium 12 into a desired size or the like are also possible. Also, the recording medium 12 is not limited to the continuous paper, and may be a form of cut paper that is separated sheet by sheet (that is, sheet paper).

On a back surface side of the platen 26, that is, on an opposite side of the medium support surface that supports the recording medium 12 on the platen 26, a temperature control unit 50 that adjusts a temperature of the recording medium 12 while recording images is provided. By temperature adjustment by the temperature control unit 50, a physical property value such as viscosity or surface tension of the ink impacted on the recording medium 12 is turned to a desired value, and a desired dot diameter can be obtained. Also, a pre-temperature-control unit 52 is provided on the upstream side in the paper feed direction of the temperature control unit 50, and an after-temperature-control unit 54 is provided on the downstream side in the paper feed direction of the temperature control unit 50. The configuration of omitting the pre-temperature-control unit 52 and/or the after-temperature-control unit 54 is also possible.

[Configuration Example of Recording Head]

Figure 3:
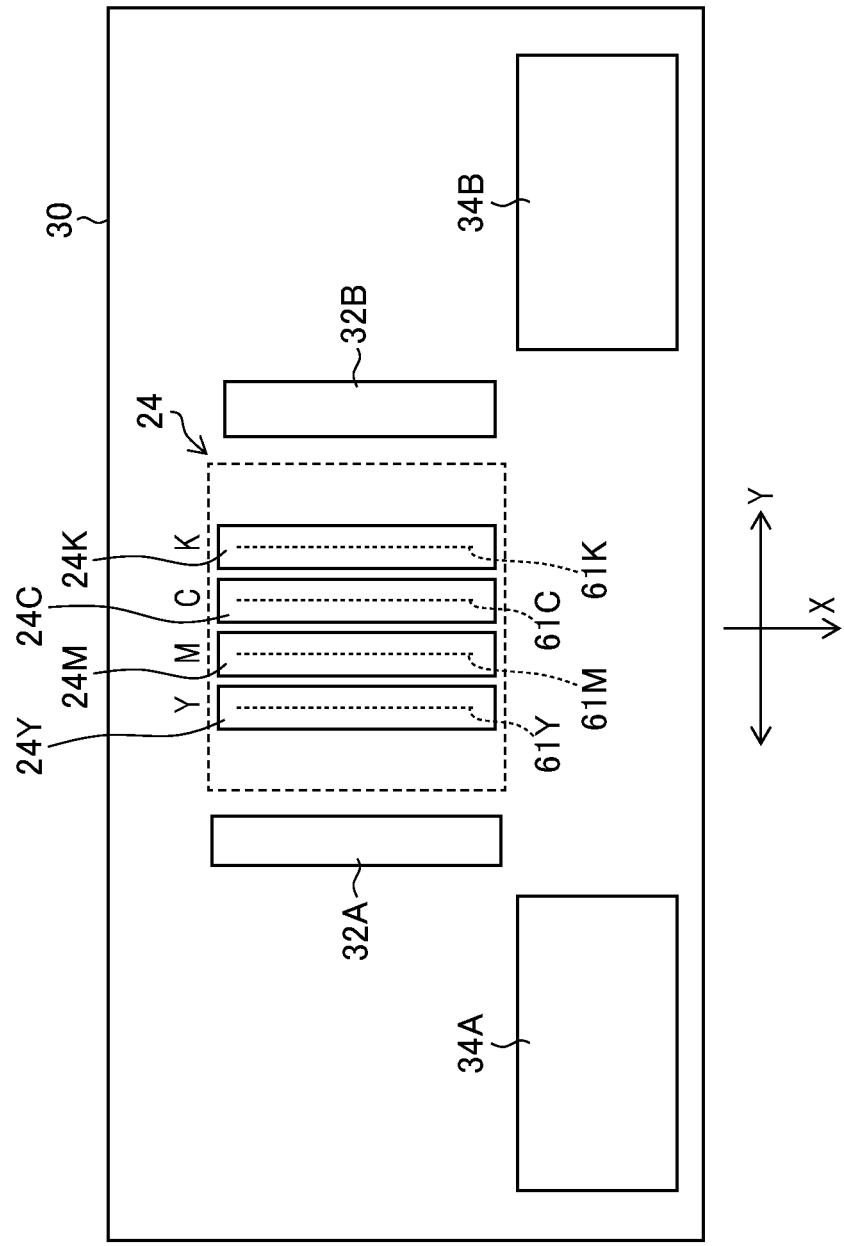
FIG. 3 is a plane transparent view illustrating an example of an arrangement form of a recording head arranged on a carriage.
Figure 4:
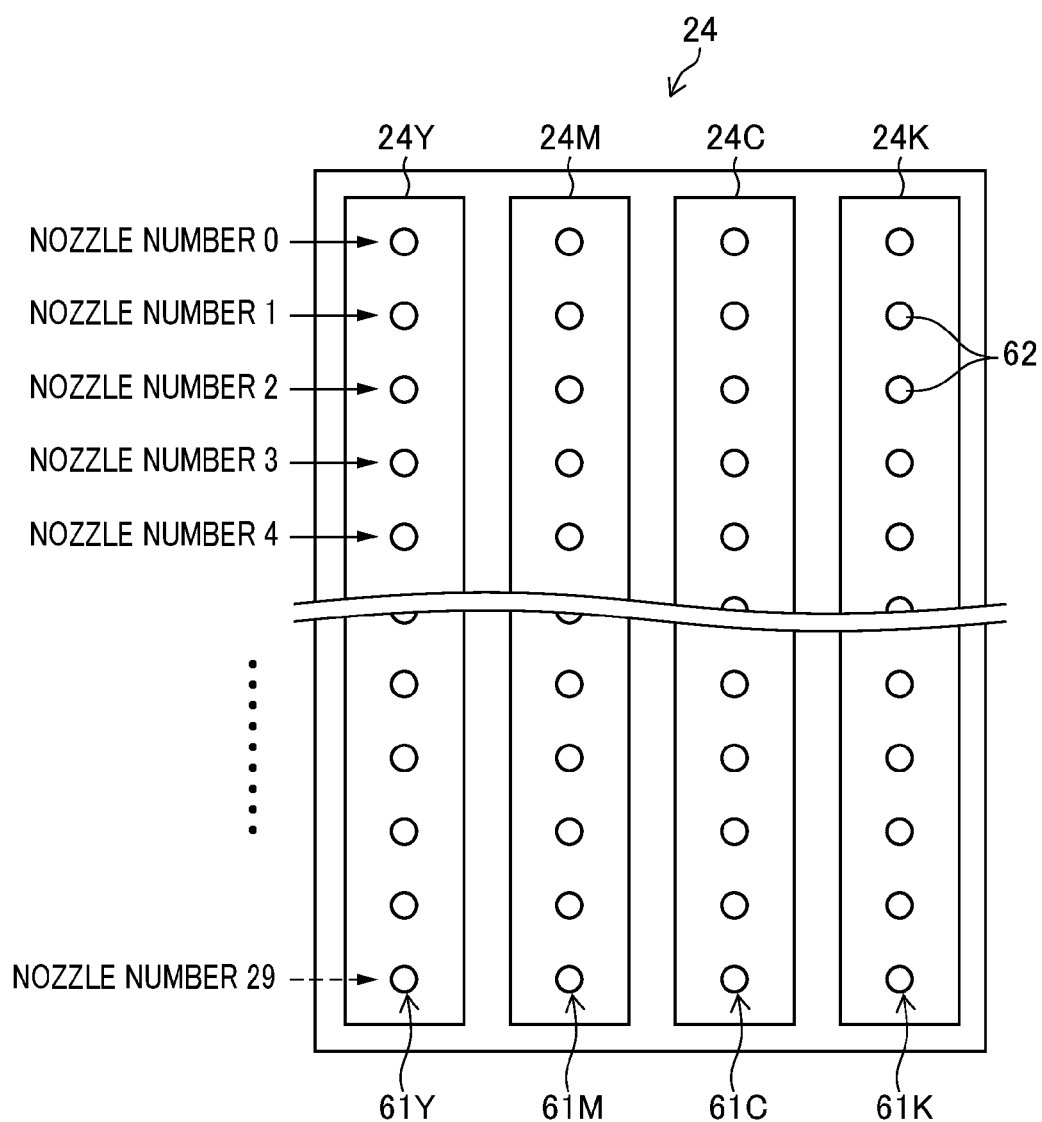
FIG. 4 is an enlarged view of the recording head in FIG. 3.

FIG. 3 is a plane transparent view illustrating an example of an arrangement form of the recording head 24, the temporarily curing light sources 32A and 32B and the full curing light sources 34A and 34B arranged on the carriage 30. FIG. 4 is an enlarged view of the recording head 24 in FIG. 3.

As illustrated in FIG. 3 and FIG. 4, the recording head 24 is provided with nozzle arrays 61C, 61M, 61Y and 61K formed by arraying nozzles 62 (see FIG. 4) for ejecting the ink of the respective colors in the sub scanning direction, for each of the ink of the respective colors that are cyan (C), magenta (M), yellow (Y) and black (K).

In FIG. 3, the nozzle arrays are illustrated by dotted lines, and individual illustrations of the nozzles are omitted. In the recording head 24 illustrated in FIG. 3 and FIG. 4, an example that the individual nozzle arrays are arranged in an order of the nozzle array 61Y for yellow, the nozzle array 61M for magenta, the nozzle array 61C for cyan, and the nozzle array 61K for black from the left of the figure is illustrated, however, kinds (the number of the colors) of the ink colors and color combinations are not limited by the present embodiment.

For example, in addition to four colors of CMYK, the configuration of using light shade ink such as light cyan or light magenta, or the configuration of using the ink of other special colors further instead of the light shade ink or in combination with the light shade ink is also possible. A form of adding a nozzle array that ejects pertinent ink corresponding to the kind of the ink color to be used is possible. Also, an arranging order of the nozzle arrays for the respective colors is not limited in particular. However, it is preferable to arrange the nozzle array of the ink whose curing sensitivity to ultraviolet rays is relatively low among a plurality of ink kinds on a side close to the temporarily curing light source 32A or 32B.

In the present embodiment, a head module is configured for each of the nozzle arrays 61C, 61M, 61Y and 61K for the respective colors, and the recording head 24 is configured by lining the head modules. Specifically, a head module 24Y having the nozzle array 61Y that ejects yellow ink, a head module 24M having the nozzle array 61M that ejects magenta ink, a head module 24C having the nozzle array 61C that ejects cyan ink, and a head module 24K having the nozzle array 61K that ejects black ink are arranged at equal intervals so as to be lined along the reciprocating moving direction (that is, the main scanning direction) of the carriage 30.

The entire module group of the head modules 24Y, 24M, 24C and 24K for the respective colors may be interpreted as "recording head", or it is also possible to interpret each head module as "recording head" respectively. Also, instead of the configuration of combining the head modules 24Y, 24M, 24C and 24K for the respective colors, the configuration of forming ink flow paths separately for the respective colors inside one recording head and having the nozzle array that ejects the ink of the plurality of colors by one head is also possible.

As illustrated in FIG. 4, for each of the nozzle arrays 61C, 61M, 61Y and 61K, the plurality of nozzles 62 are lined and arrayed at fixed intervals in the sub scanning direction. FIG. 4 illustrates an example that 30 pieces of the nozzles 62 are arrayed respectively in the nozzle arrays 61C, 61M, 61Y and 61K for the respective colors. To the individual nozzles 62, nozzle numbers 0-29 are imparted.

The nozzle numbers in this example are imparted to the individual nozzles 62 by consecutive numbers in an order from one end side to the other end side in the sub scanning direction in the nozzle array. In this example, the nozzle numbers start from the number 0, however, a leading number of the nozzle numbers may be the number 1. The leading number can be an arbitrary integer equal to or larger than 0. The nozzle numbers can be used as identification numbers indicating positions of the individual nozzles 62.

Also, the nozzle array in which 30 pieces of the nozzles 62 are arranged in one line along the sub scanning direction is illustrated, however, the number of the nozzles configuring the nozzle array and an arrangement form of the nozzles are not limited to this example. For example, it is possible to form the nozzle array in which the nozzles are lined at equal intervals in the sub scanning direction by a two-dimensional nozzle array for which the plurality of nozzle arrays are combined.

As an ink ejection system of the recording head 24, a piezojet system of jetting the ink by deformation of a piezoelectric element is adopted. The configuration of using an electrostatic actuator instead of the piezoelectric element as an ejection energy generating element is also possible. Also, it is possible to adopt a thermal jet system of generating air bubbles by using a heat generating body (heating element) such as a heater and heating the ink, and jetting ink droplets by the pressure. However, since generally the ultraviolet curing type ink is highly viscous compared to solvent ink, in the case of using the ultraviolet curing type ink, it is preferable to adopt the piezojet system of relatively great ejection power.

The recording head 24 ejects the ink to the recording medium 12 while moving in the main scanning direction, and performs image recording in an area having a fixed length in the sub scanning direction of the recording medium 12. Then, when the recording medium 12 is moved by a fixed amount in the sub scanning direction after the image recording, the recording head 24 performs the similar image recording in the next area, and thereafter, repeatedly performs the similar image recording every time the recording medium 12 is moved by the fixed amount in the sub scanning direction, and can perform the image recording over the entire surface of a recording area of the recording medium 12.

In this way, the recording head 24 is a serial type recording head. The inkjet recording device 10 (see FIG. 1) of the present embodiment adopts a multipath system that achieves a predetermined recording resolution by a plurality of times of scanning by the recording head 24 in the main scanning direction.

[Configuration of Control System of Inkjet Recording Device]

Figure 5:
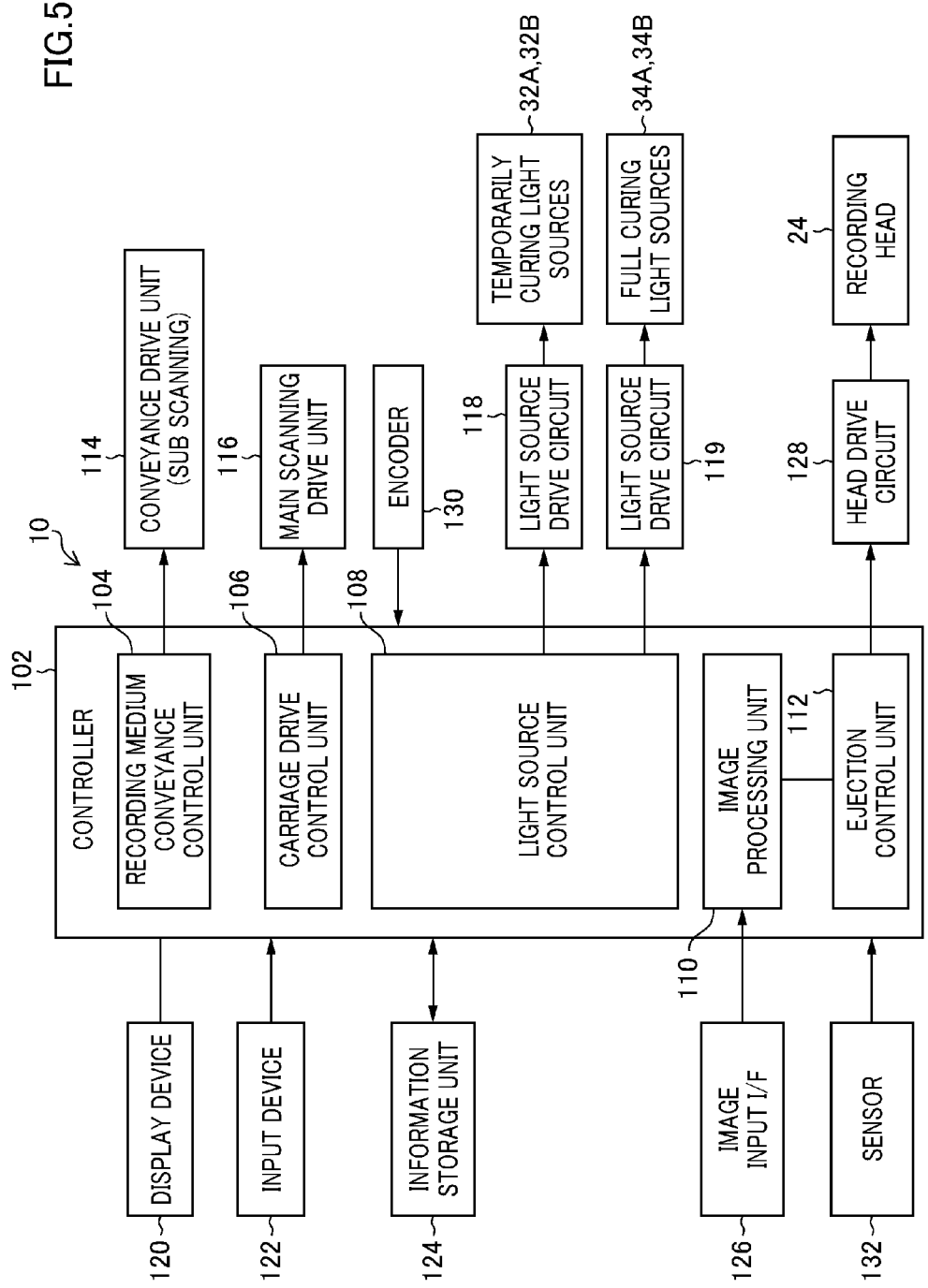
FIG. 5 is a block diagram illustrating a configuration of the inkjet recording device.

FIG. 5 is a block diagram illustrating the configuration of the inkjet recording device 10. As illustrated in FIG. 5, the inkjet recording device 10 includes a controller 102. As the controller 102, for example, a computer including a central processing unit (CPU) can be used. The controller 102 generally controls the entire inkjet recording device 10 by executing various kinds of programs read from an information storage unit 124.

The controller 102 includes a recording medium conveyance control unit 104, a carriage drive control unit 106, a light source control unit 108, an image processing unit 110, and an ejection control unit 112. These respective units can be realized by hardware or software, or the combination thereof. "Software" has the same meaning as "program" or "application".

The recording medium conveyance control unit 104 controls a conveyance drive unit 114 that conveys the recording medium 12. The conveyance drive unit 114 includes a drive motor that drives the nip roller 40 (see FIG. 2), and a drive circuit thereof. The recording medium 12 conveyed onto the platen 26 is intermittently fed in the sub scanning direction by a swath width unit, matched with scanning (movement of a print path) in the main scanning direction by the recording head 24. A swath width is a length in the sub scanning direction determined by a repetition cycle of a scan by the reciprocating movement of the carriage 30, and is obtained by dividing a nozzle array length which is the length in the sub scanning direction of the nozzle array by the number of paths which is the number of times of repeating the scan. The number of the paths which is the number of times of repeating the scan is the number of times of the scanning required for completing drawing by a set recording resolution, and is determined by an image drawing mode. Details of the image drawing mode are described later.

The carriage drive control unit 106 controls a main scanning drive unit 116 that moves the carriage 30 in the main scanning direction. The main scanning drive unit 116 includes a drive motor connected to a moving mechanism of the carriage 30, and a control circuit thereof.

To the drive motor of the main scanning drive unit 116 and the drive motor of the conveyance drive unit conveyance drive unit 114 described above, an encoder 130 is attached. The encoder 130 inputs pulse signals according to a rotation amount and a rotation speed of each drive motor to the controller 102. Thus, the controller 102 can recognize a position of the carriage 30 and a position of the recording medium 12 on the basis of the pulse signals inputted from the encoder 130.

The light source control unit 108 controls light emission of the temporarily curing light sources 32A and 32B through a light source drive circuit 118, and also controls light emission of the full curing light sources 34A and 34B through a light source drive circuit 119.

The image processing unit 110 executes image processing to image data inputted through an image input interface 126, and converts the image data to dot data for print. In FIG. 5, for simplification of notation, a notation "IF" is used as a substituting notation substituting a description of an interface. IF is an abbreviation notation of "interface".

The image processing unit 110 functions as a halftone processing unit that executes halftone processing by a dither method. That is, the image processing unit 110 performs quantization processing of a pixel value using a dither mask to a continuous gradation image which is the inputted image data, and generates a halftone image corresponding to the dot data for print. The dither mask used in the halftone processing in the image processing unit 110 is generated by applying the present invention. A method of generating the dither mask is described later.

The ejection control unit 112 controls ejection of the ink from the individual nozzles 62 of the recording head 24, by controlling a head drive circuit 128 that drives the recording head 24 on the basis of the dot data generated in the image processing unit 110.

For the information storage unit 124, a nonvolatile memory is used for example, and various kinds of programs required for control of the controller 102 and various kinds of data are stored. For example, the information storage unit 124 stores, as the programs, a control program to be executed by the individual units of the controller 102, and a scanning pattern program, or the like. The scanning pattern program is a program for multipath type image recording, and defines reciprocating scanning (the movement of the print path) in the main scanning direction by the recording head 24 to the recording medium 12 intermittently conveyed in the sub scanning direction, and the number of the paths (the number of times of repeating the scan). The movement of the print path accompanied by the movement of the recording head 24 in the main scanning direction includes at least one of a moving direction of the recording head 24 when forming dots, selection of the nozzle to eject the ink, and an ejection timing. A pattern of the scanning determined by a combination of the movement of the print path and the number of the paths is called "scanning pattern".

To the controller 102, an input device 122 and a display device 120 are connected. For the input device 122, for example, various kinds of devices such as a keyboard, a mouse, a touch panel or an operation button can be adopted, and it may be an appropriate combination thereof. The input device 122 inputs external operation signals by a manual operation of an operator who is a user to the controller 102.

For the display device 120, a liquid crystal display or the like is used. An operator can input various kinds of information using the input device 122. Also, an operator can confirm various kinds of information such as input contents and a state of a system or the like through display at the display device 120.

A sensor 132 is attached to the carriage 30. The controller 102 can recognize a width of the recording medium 12 on the basis of sensor signals inputted from the sensor 132.

[Explanation of Multipath Type Image Recording Method]

Figure 6:
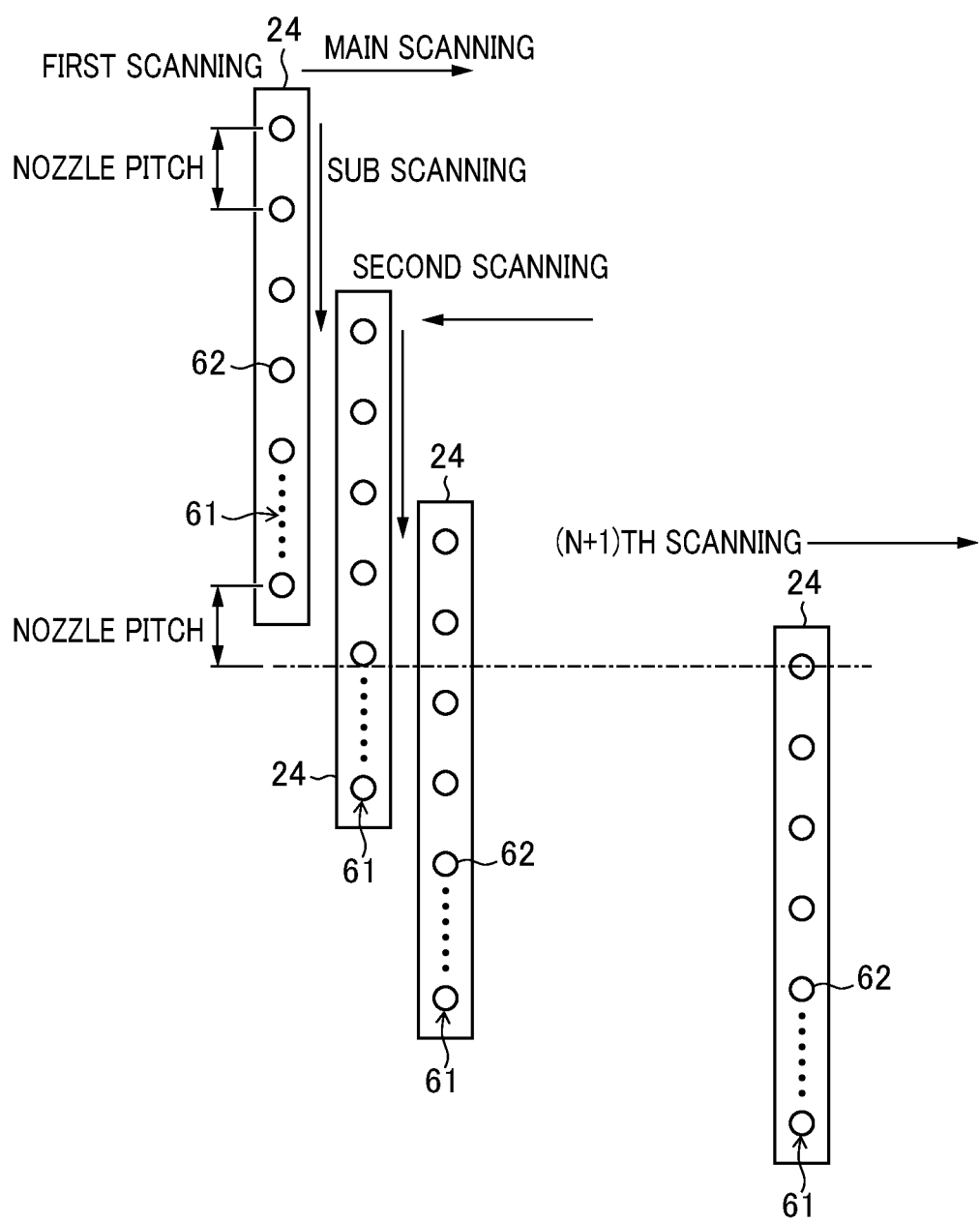
FIG. 6 is an explanatory diagram for explaining one example of a multipath type image recording method.

FIG. 6 is an explanatory diagram for explaining one example of a multipath type image recording method. Here, in order to simplify an explanation, the configuration of the recording head 24 is simplified, and the case that there is only one nozzle array of the recording head 24 and recording is performed by one nozzle array 61 is described as an example. It can be understood that the nozzle array 61 is indicated representing any one array of the nozzle arrays 61C, 61M, 61Y and 61K described in FIG. 4.

Also, for the configuration of intermittently feeding the recording medium in the sub scanning direction, for convenience of the illustration, in FIG. 6, the illustration is such that the recording medium is stopped and the recording head 24 is intermittently moved in the sub scanning direction. In FIG. 6, the illustration of the recording medium is omitted, and only the movement of the recording head 24 is illustrated.

As illustrated in FIG. 6, the ink is ejected from the nozzles 62 when the recording head 24 is moved in the main scanning direction (a crosswise direction in FIG. 6). By the combination of the reciprocating movement of the recording head 24 along the main scanning direction and intermittent feed of the recording medium in the sub scanning direction (a longitudinal direction in FIG. 6), two-dimensional image recording is performed on the recording medium. The term "image recording" may be replaced with the term of drawing, image drawing, print or image formation.

An operation that the recording head 24 ejects the ink from the nozzles 62 and records dots while moving in the main scanning direction is called "scan" or "scanning". For the scan, there may be the scan performed in an outward path in the main scanning direction and the scan performed in a homeward path. The image may be recorded by the scan in both directions of the outward path and the homeward path, and the image may be recorded by the scan in only one direction of the outward path or the homeward path. In the case of performing the scan in both directions of the outward path and the homeward path, the scan of reciprocating once is counted as execution of two times of the scan for the outward path scan and the homeward path scan.

In the case of defining N as a natural number and completing the image of a desired recording resolution by N times of the scan, relative positional relation (here, the positional relation in the sub scanning direction) between the recording medium of the (N+1)th scanning and the recording head 24 becomes the relation illustrated in FIG. 6. That is, in order to perform the image recording of the desired recording resolution by N times of writing, the positional relation is such that the recording medium is intermittently fed in the sub scanning direction for the first time, the second time, the third time, . . . and is connected to a position corresponding to the length of the nozzle array just at the (N+1)th time. In order to seamlessly connect the operation of writing N times, movement is made in the sub scanning direction by a portion of "the nozzle array length+one nozzle pitch" from the sub scanning direction position of the first scanning and the (N+1)th scanning is performed. "Nozzle array length" is the length in the sub scanning direction of the nozzle array 61 in which the nozzles 62 are lined and arrayed in the sub scanning direction, and corresponds to an inter-nozzle distance of the nozzles positioned at both ends of the nozzle array. "Nozzle pitch" is a nozzle interval in the sub scanning direction in the nozzle array.

As one example, the case of using the recording head 24 having the nozzle array 61 in which the nozzles 62 are lined at a nozzle array density 100 npi, and achieving the recording resolution of main scanning 600 dpi×sub scanning 400 dpi by eight paths (eight times of writing) of two paths in the main scanning direction and four paths in the sub scanning direction (main 2×sub 4) is considered. A unit npi (nozzle per inch) is a unit indicating the number of nozzles per inch. A unit dpi (dot per inch) is a unit indicating the number of dots per inch. One inch is about 25.4 millimeters.

Here, an interval of deposition points determined from the recording resolution is called "deposition point interval", and a lattice indicating positions of recordable deposition points is called "deposition point lattice". "Deposition point" has the same meaning as "pixel" for which recording or non-recording of the dot can be controlled. "Deposition point interval" has the same meaning as "pixel interval", and corresponds to the minimum dot interval at the recording resolution. "Deposition point lattice" has the same meaning as "pixel lattice". "Lattice" has the same meaning as cells of a matrix expressed by rows and columns.

In the case of the recording resolution of main scanning 600 dpi×sub scanning 400 dpi, the deposition point interval in the main scanning direction is 25.4 (millimeters)/600≈42.3 micrometers, and the deposition point interval in the sub scanning direction is 25.4 (millimeters)/400=63.5 micrometers. This indicates a size "42.3 micrometers×63.5 micrometers" of one cell (corresponding to one pixel) of the deposition point lattice. For feed control of the recording medium 12 and control of a deposition position (that is, a deposition timing) from the recording head 24, a feed amount and the position are controlled with the deposition point interval determined from the recording resolution as a unit. The deposition point interval determined from the recording resolution is sometimes called "resolution pitch" or "pixel pitch". Also, while the nozzle pitch can be indicated by a unit of the length, instead, it can be indicated with the deposition point interval (pixel pitch) in the sub scanning direction as a unit. For example, in the case that the nozzle array density is 100 npi for the recording resolution of sub scanning 400 dpi, since the nozzle pitch is four times the pixel pitch in the sub scanning direction, with the pixel pitch in the sub scanning direction as the unit, the nozzle pitch can be expressed as "4".

In the case of N=8 by two paths in the main scanning direction and four paths in the sub scanning direction, to fill a deposition point line in the main scanning direction by two times of the scanning and to fill a deposition point line in the sub scanning direction by four times of the scanning, recording of 2×4 pieces of deposition point lattices is performed by eight times of the scanning (that is, eight paths). "Deposition point line" means a scanning line and has the same meaning as a raster line.

Figure 7:
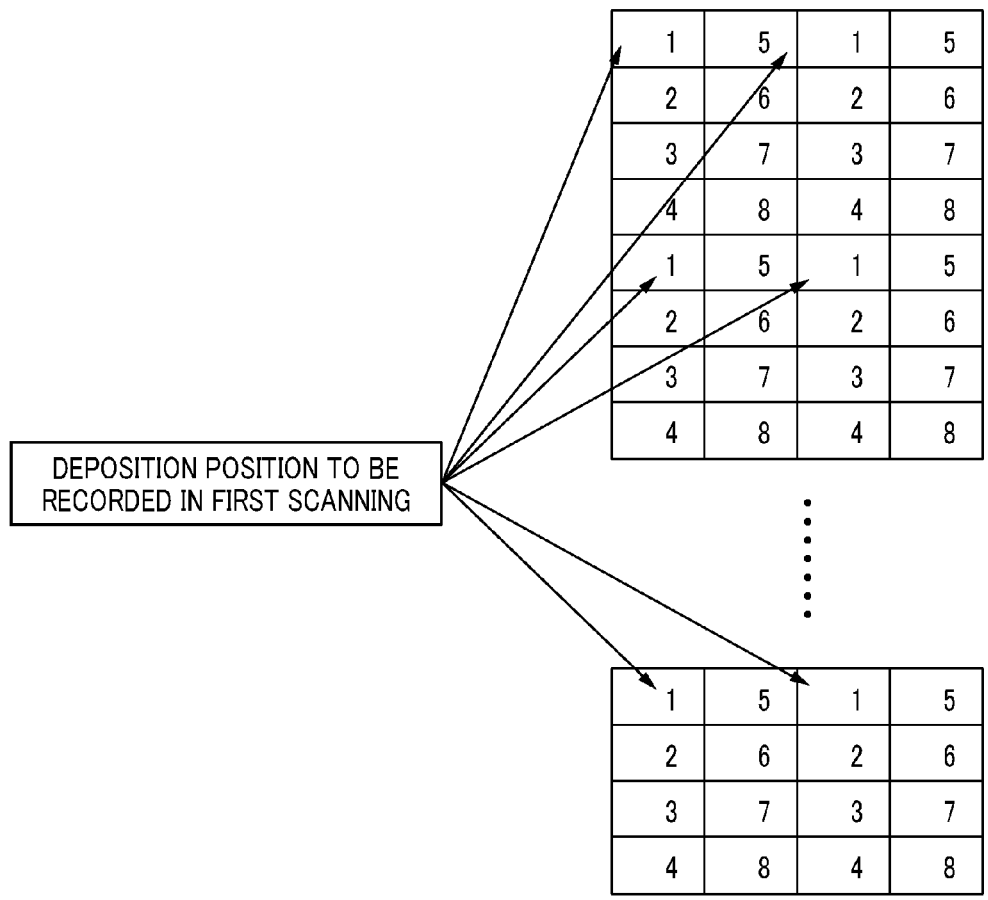
FIG. 7 is a schematic diagram schematically illustrating relation between a number of each scanning by a drawing operation of writing eight times and a deposition position recorded by the scanning.

FIG. 7 is a schematic diagram schematically illustrating relation between a number (1 to 8) of each scanning by a drawing operation of writing eight times and a deposition position recorded by the scanning. In FIG. 7, the individual cells to which numbers of 1 to 8 are attached indicate the deposition positions (pixel positions) to be recorded by the nozzles 62, and the numbers 1-8 indicate the number of the scanning indicating in the scanning of what order the pixel position is to be recorded. For example, the cell (pixel) to which the number "1" is attached indicates the deposition position to be recorded in the first scanning.

As is clear from FIG. 7, for an arrangement distribution of the numbers 1 to 8 indicating a scanning order to record the individual deposition positions, the lattice of "2×4" of main 2×sub 4 is a basic unit of repetition. The lattice of 2×4 is called "basic unit lattice" or "2×4 lattice". A method of filling the 2×4 lattice (a deposition order) can be variously assumed without being limited to the example illustrated in FIG. 7.

According to the image drawing mode, the recording resolution and the scanning pattern are determined, and the number of the cells of the basic unit lattice, an array form of the cells, and the numbers (scanning orders) of the scanning of the individual cells are determined.

[Example of Image Drawing Mode]

As already described, for the inkjet recording device 10, multipath type drawing control is applied, and the recording resolution can be changed by changing the number of the print paths. For example, three kinds of modes that are a high production mode, a standard mode, and a high image quality mode are prepared, and the recording resolution is different respectively in the individual modes. The recording resolution has the same meaning as "printing resolution". The image drawing mode can be selected according to print purposes or uses. The term "image drawing mode" may be replaced with "print mode".

A specific description is given with a simple numerical example. It is assumed that the nozzle array density in the sub scanning direction of the nozzle array 61 in the recording head 24 is 100 npi.

In the case of the high production mode, recording is performed by the recording resolution of main scanning 600 dpi×sub scanning 400 dpi, and the recording by the recording resolution of 600 dpi is achieved by two paths (two times of the scanning) in the main scanning direction. That is, dots are formed by the resolution of 300 dpi in the first scanning (outward path of the carriage 30). In the second scanning (homeward path), dots are formed so as to complement the middle of the dots formed by the first scanning (outward path) by 300 dpi, and the resolution of 600 dpi is obtained for the main scanning direction.

On the other hand, for the sub scanning direction, the nozzle pitch is 100 npi, and dots are formed by the resolution of 100 dpi in the sub scanning direction by one time of main scanning (one path). Therefore, the recording resolution of 400 dpi is achieved by performing complementary printing by four-path printing (four times of the scanning).

In the standard mode, recording is executed by the recording resolution of 600 dpi×800 dpi, and the resolution of 600 dpi×800 dpi is obtained by two-path printing in the main scanning direction, and eight-path printing in the sub scanning direction.

In the high image quality mode, printing is executed by the resolution of 1200 dpi×1200 dpi, and the recording resolution of 1200 dpi×1200 dpi is obtained by four paths in the main scanning direction and 12 paths in the sub scanning direction.

[About Nozzle Ejection Rate]

Here, the nozzle ejection rate is described. The nozzle ejection rate is a value indicating a ratio of recording pixels for which each nozzle 62 ejects ink to record a dot in recording attending pixels allocated to each nozzle as pixels for which each of the plurality of nozzles 62 in the recording head 24 is in charge of recording.

The nozzle ejection rate is determined for each nozzle. The nozzle ejection rate is indicated by the quotient of division, whose denominator is the number of the recording attending pixels allocated to each nozzle, and whose numerator is the number of the recording pixels for which each nozzle ejects ink to record a dot, and can be indicated by a numerical value equal to or larger than 0 and is equal to or smaller than 1. Also, the nozzle ejection rate can be also indicated by a percentage. The nozzle ejection rate increases as a duty increases, and becomes "1.0" or "100%" which is a maximum value at the duty 100%.

In short, the nozzle ejection rate indicates a ratio of ejecting ink for each nozzle 62. The ratio of ejecting ink for each nozzle 62 is equal to the ratio of the recording pixels for each nozzle 62. The nozzle ejection rate can be understood as the ratio of using the nozzles, and can be considered as a nozzle using rate or a nozzle operation rate.

Specifically, the nozzle ejection rate indicates a using rate for each nozzle 62, in the case that the using rate for each nozzle 62 when recording of a solid pattern which is a uniform gradation image of a maximum density is defined as "1.0" or "100%" which is a reference value. The using rate for each nozzle 62 may be replaced with an ink ejection amount for each nozzle 62 or may be replaced with the number of pixels of the recording pixels for each nozzle 62.

In contrast, a relative using ratio of the individual nozzles is called a nozzle relative ejection rate. The nozzle relative ejection rate is a control target of the nozzle ejection rate, and indicates a relative ratio of the nozzle ejection rates of the individual nozzles.

The nozzle relative ejection rate has a meaning in a relative ratio between the nozzles of the nozzle ejection rates of the individual nozzles, and an absolute value and the maximum value of the numerical value itself of the nozzle relative ejection rate do not have a meaning as a physical quantity in particular. For the absolute value of the nozzle relative ejection rates of the individual nozzles, a total sum of the nozzle relative ejection rates of all the nozzles may be standardized to 1, the maximum value may be standardized to 1, or it may be the ratio of the recording pixels to the number of recording attending pixels for each nozzle. In the present embodiment, for convenience, the nozzle ejection rate of maximum ejection (maximum using rate) is defined as "1.0", and the nozzle relative ejection rate is indicated by the ratio to the maximum value.

While the dither mask generation method relating to the embodiment is described in detail later, the nozzle relative ejection rate as the control target corresponds to "priority pixel setting rate". That is, the nozzle relative ejection rate is used as "priority pixel setting rate".

When generating a dither mask, the nozzle relative ejection rate (corresponding to the "priority pixel setting rate") as the control target is determined, and the thresholds of the individual pixels are set so as to increase the nozzle ejection rate while roughly keeping the nozzle relative ejection rate (the relative ratio of the nozzle ejection rates of the individual nozzles) together with increase of the duty.

Figure 8:
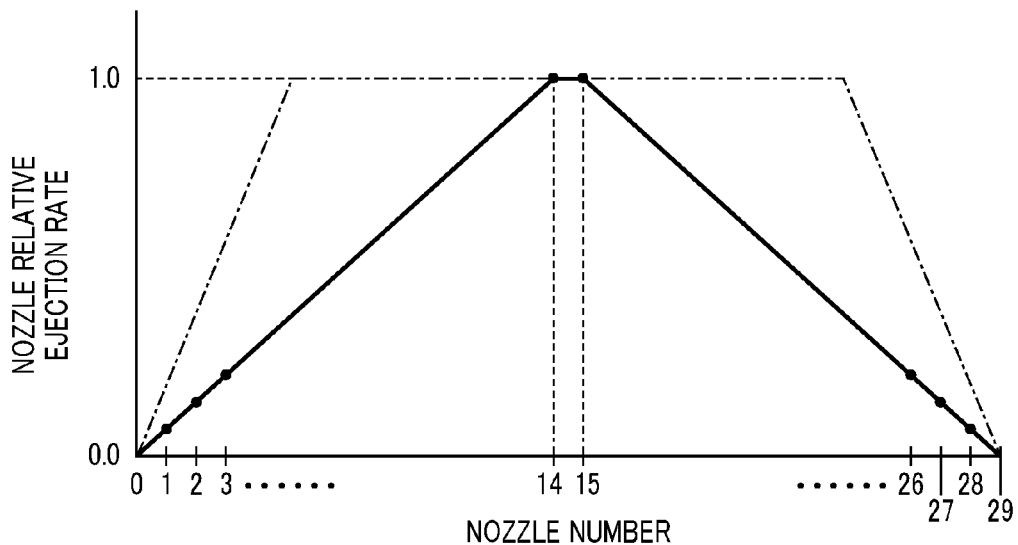
FIG. 8 is a diagram illustrating one example of data of a nozzle relative ejection rate determined for each nozzle.

FIG. 8 is a diagram illustrating one example of data of the nozzle relative ejection rate determined for each nozzle. In FIG. 8, a horizontal axis indicates the nozzle number, and a vertical axis indicates the nozzle relative ejection rate corresponding to each nozzle number. In FIG. 8, the nozzle relative ejection rate of the nozzle of the maximum ejection is defined as "1.0", and the nozzle relative ejection rates of the individual nozzles with respect to it are indicated.

Also, in the example illustrated in FIG. 8, to suppress banding similarly to Japanese Patent Application Laid-Open No. 2010-162770 gazette, the nozzle relative ejection rate of the nozzle arranged at the end of the nozzle array is set to be lower than the nozzle relative ejection rate of the nozzle arranged at the center part of the nozzle array. For example, as illustrated by a solid line in FIG. 8, the nozzle relative ejection rate is set to be gradually high from the individual nozzles at both ends of the nozzle number 0 and the nozzle number 29 positioned at both ends of the nozzle array to the nozzles of the nozzle number 14 and the nozzle number 15 positioned at the center part of the nozzle array respectively.

Or, as illustrated by a dashed line in FIG. 8, the nozzle relative ejection rate of the nozzle groups positioned at both ends of the nozzle array (for example, the nozzle group of the nozzle numbers 0 to 5 and the nozzle group of the nozzle numbers 24 to 29) may be set relatively low, and the nozzle relative ejection rate of the nozzles positioned between both ends may be set at "1.0", and regarding setting of the nozzle relative ejection rate, not only the example illustrated in FIG. 8 but also various setting forms can be assumed.

The nozzle relative ejection rate for each nozzle can be arbitrarily set by a user in addition to the configuration programmed beforehand. For example, a user can input the nozzle relative ejection rate for each nozzle by utilizing an appropriate user interface, or select a desired pattern from two or more kinds of prepared nozzle relative ejection rate data candidate patterns.

[Explanation of Dither Mask Generation Method]

Figure 9:
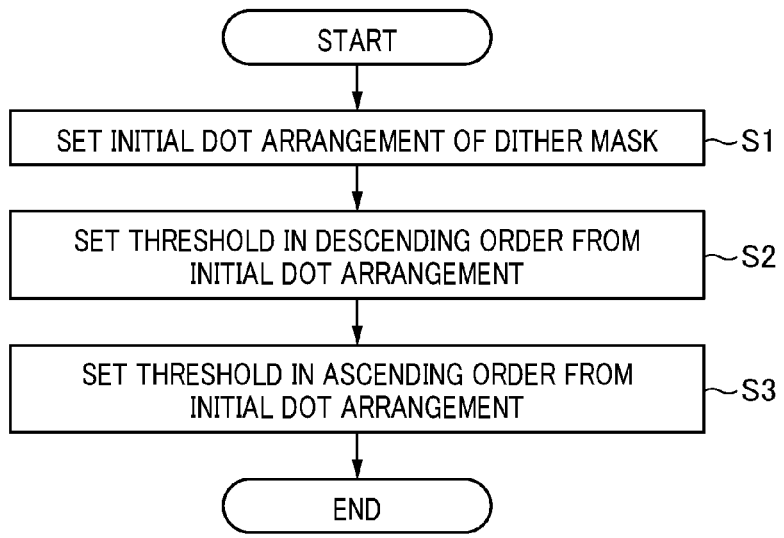
FIG. 9 is a flowchart illustrating a procedure of a dither mask generation method.

FIG. 9 is a flowchart illustrating a procedure of the dither mask generation method relating to the embodiment. The dither mask generation method of the present embodiment includes a process (step S1) of setting an initial dot arrangement of a dither mask, a process (step S2) of setting thresholds in a descending order from the initial dot arrangement, and a process (step S3) of setting the thresholds in an ascending order from the initial dot arrangement.

Here, in order to simplify the dither mask generation method, the initial dot arrangement is a dot arrangement of an extremely low duty, and does not reflect the nozzle relative ejection rate. An initial duty of "extremely low duty" corresponding to the initial dot arrangement can be a value larger than 0% and equal to or smaller than 1% for example, and is a value equal to or larger than 0.1% and equal to or smaller than 0.5% more preferably. At the duty about this low, influence of the setting of the nozzle relative ejection rate can be almost neglected. For the duty (initial duty) of the initial dot arrangement is not limited to the numerical value exemplified above and may be a value small enough to neglect the influence of the setting of the nozzle relative ejection rate.

In the initial dot arrangement setting process in step S1, dots for a dot number corresponding to the predetermined initial duty are arranged in a mask area which is an area of a pixel array equal to a mask size of the dither mask.

The descending order threshold setting process illustrated in step S2 is a process of performing processing of setting the thresholds of individual gradations without reflecting the nozzle relative ejection rate using a known threshold setting method. "Descending order" is a procedure of setting the threshold from a threshold of a large value and successively setting the threshold of a small value. "Descending order" in step S2 means the processing of successively setting the threshold of the small value from the threshold of the gradation corresponding to the initial dot arrangement.

That is, in step S2, the processing of successively setting smaller thresholds to threshold non-set pixels in the descending order while gradually removing dots from the initial dot arrangement is performed. "Threshold non-set pixel" in the descending order is a pixel with a dot. "With a dot" means the same as "dot-on".

The ascending order threshold setting process illustrated in step S3 is a process of performing the processing of setting the thresholds to the threshold non-set pixels in the ascending order reflecting the nozzle relative ejection rate (corresponding to "priority pixel setting rate"). "Ascending order" is a procedure of setting the threshold from a threshold of a small value and successively setting the threshold of a large value. "Ascending order" in step S3 means the processing of successively setting the threshold of the large value from the threshold of the gradation corresponding to the initial dot arrangement.

An order of the threshold setting process (step S2) by the descending order and the threshold setting process (step S3) by the ascending order can be switched around.

First Embodiment

Figure 10:
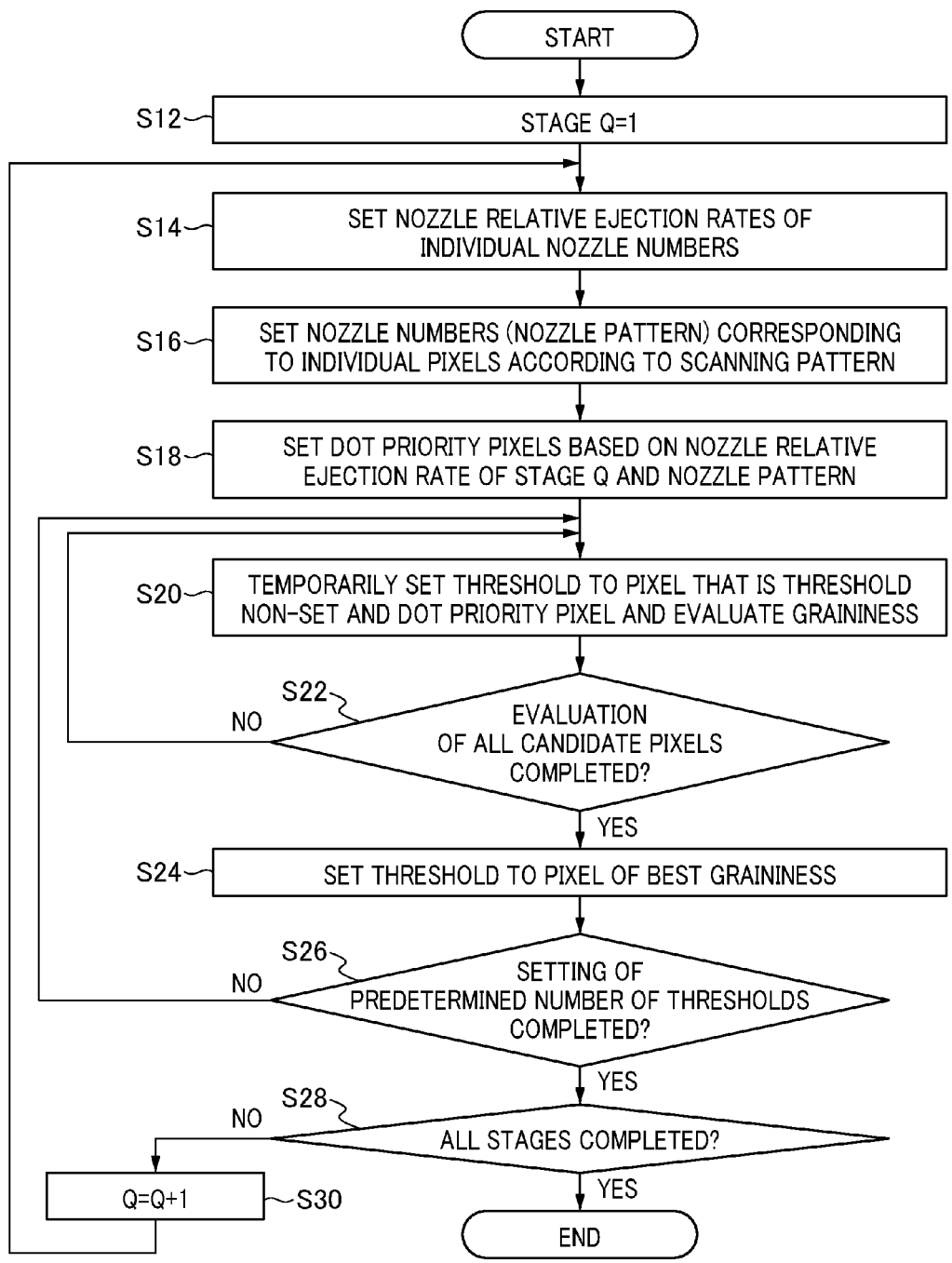
FIG. 10 is a flowchart illustrating an example of ascending order threshold setting processing by a first embodiment.

FIG. 10 is a flowchart illustrating an example of ascending order threshold setting processing applied to the ascending order threshold setting process (step S3 in FIG. 9).

In the ascending order threshold setting processing according to the first embodiment illustrated in FIG. 10, first, a stage Q of the setting of the nozzle relative ejection rate is set to "stage Q=1" which is an initial value (step S12). In the present embodiment, since the nozzle relative ejection rate for each nozzle is switched and set stepwise according to an area of the duty, the nozzle relative ejection rate is provided with the stage. The stage Q is a variable indicating the stage of the nozzle relative ejection rate.

In the present embodiment, the nozzle relative ejection rate can be utilized as "priority pixel setting rate", and the term "nozzle relative ejection rate" can be replaced with "priority pixel setting rate" and understood.

Figure 11:
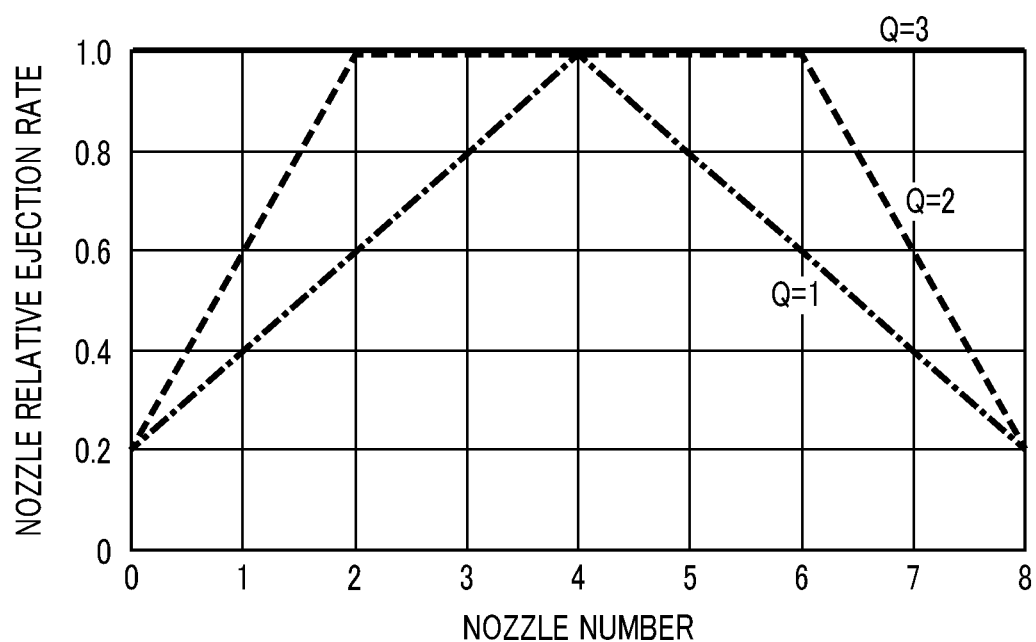
FIG. 11 is a diagram illustrating an example of nozzle relative ejection rates of individual stages when the number of stages is three.

FIG. 11 illustrates an example of the nozzle relative ejection rates of the individual stages in the case that the number of the stages is three. The horizontal axis in FIG. 11 indicates the nozzle number, and the vertical axis indicates the nozzle relative ejection rate. In FIG. 11, a graph of Q=1 illustrates the nozzle relative ejection rate of a stage 1, a graph of Q=2 illustrates the nozzle relative ejection rate of a stage 2, and a graph of Q=3 illustrates the nozzle relative ejection rate of a stage 3 respectively. Here, an example of the recording head for which the number of the nozzles is nine is described.

"Q" indicating the stage can take an integer value from Q=1 to the maximum value of the stage, in the ascending order of the nozzle relative ejection rate. That is, when k is an integer equal to or larger than 1, the nozzle relative ejection rate of a stage k+1 is higher than the nozzle relative ejection rate of a stage k. The nozzle relative ejection rate of the stage 1 is the lowest, and the nozzle relative ejection rate of the final stage (the nozzle relative ejection rate of the stage 3 in FIG. 11) is all "1.0" for the individual nozzles.

Under the setting of the nozzle relative ejection rate of the stage 1, the individual nozzles can record dots only in a range of the nozzle relative ejection rate illustrated in the graph of the stage 1. That is, when the nozzle relative ejection rates of the individual nozzles are set as in the graph of the stage 1, an upper limit of the duty recordable under the setting is determined. In the case of the stage 1 in FIG. 11, the upper limit of the recordable duty is roughly 56%. Therefore, in order to set the threshold of the dither mask to the maximum duty of 100%, the nozzle relative ejection rate needs to be increased further from the stage 1 and the nozzle relative ejection rates of all the nozzles need to be all "1.0" in the final stage. That is, according to increase of the value of the threshold to be set to the threshold non-set pixel of the dither mask, the setting of the nozzle relative ejection rate needs to be changed to the plurality of stages that are at least two stages.

While a setting form of the nozzle relative ejection rates in three stages (Q=1, 2, 3) is exemplified in FIG. 11, the minimum number of the stages is two. It can be the arbitrary number of the stages equal to or more than two.

Figure 12:
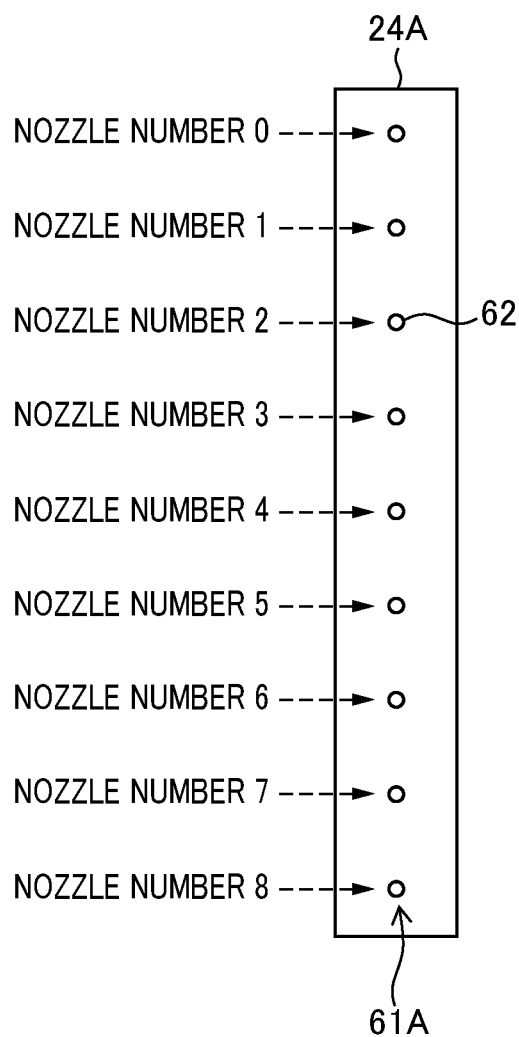
FIG. 12 is a schematic diagram of a recording head for which the number of nozzles is nine.

FIG. 12 is a schematic diagram of the recording head for which the number of the nozzles is nine. As illustrated in FIG. 12, a recording head 24A has a nozzle array 61A in which nine nozzles 62 are arranged in one line at equal intervals in the sub scanning direction. From the nozzle 62 at an upper end in FIG. 12 which is one end of the nozzle array 61A to a lower end in FIG. 12 which is the other end, respectively intrinsic nozzle numbers 0, 1, 2 . . . 8 are imparted in an order to the individual nozzles 62. The nozzle array density of the nozzle array 61A can be variously designed, and is assumed to be 300 npi in the sub scanning direction for example.

The nozzle relative ejection rates of the individual nozzles 62 in the nozzle array 61A of the recording head 24A illustrated in FIG. 12 can be switched and set to the nozzle relative ejection rates of the individual stages that are the stages 1 to 3 as illustrated in FIG. 11, for example.

In step S12 in FIG. 10, after setting the stage Q=1, the process advances to step S14. In step S14, the nozzle relative ejection rates of the individual nozzles 62 in the recording head 24A are set. The nozzle relative ejection rate set here corresponds to one form of "priority pixel setting rate", and a nozzle relative ejection rate setting process in step S14 corresponds to one form of "priority pixel setting rate setting process". In the case that the stage Q=1 is set, the nozzle relative ejection rates of the individual nozzles 62 in the nozzle array 61A of the recording head 24A illustrated in FIG. 12 are set as in the graph illustrated in the stage Q=1 in FIG. 11.

Next, in step S16 in FIG. 10, the nozzle numbers (that is, the nozzle pattern) corresponding to the individual pixels are set according to the scanning pattern. The process of step S16 is a process of performing the processing of setting the nozzle numbers corresponding to the individual pixels of the dither mask according to the scanning pattern when the image recording by the inkjet recording device 10 is performed, for an image area (that is, the mask area) having a pixel array with the number of pixels equal to the mask size of the dither mask.

The nozzle numbers corresponding to the individual pixels mean the nozzle numbers of the nozzles in charge of the recording of the individual pixels. The process of step S16 corresponds to determining the respectively corresponding nozzle numbers for the individual pixels of the dither mask.

In the case that m and n are natural numbers respectively and the dither mask which is a generation target is a matrix of m rows×n columns, the respectively corresponding nozzle numbers are determined for the individual pixels of the image area formed by a two-dimensional pixel array of m rows×n columns. A pattern of the nozzle numbers in which the corresponding nozzle numbers are determined for the individual pixels of the dither mask is called a "nozzle pattern".

The process of step S16 corresponds to the process of setting the nozzle pattern indicating a correspondence relation between the individual pixels of the dither mask and the numbers of the nozzles in charge of the recording of the respective pixel positions, and corresponds to one form of "nozzle pattern setting process".

Figure 13:
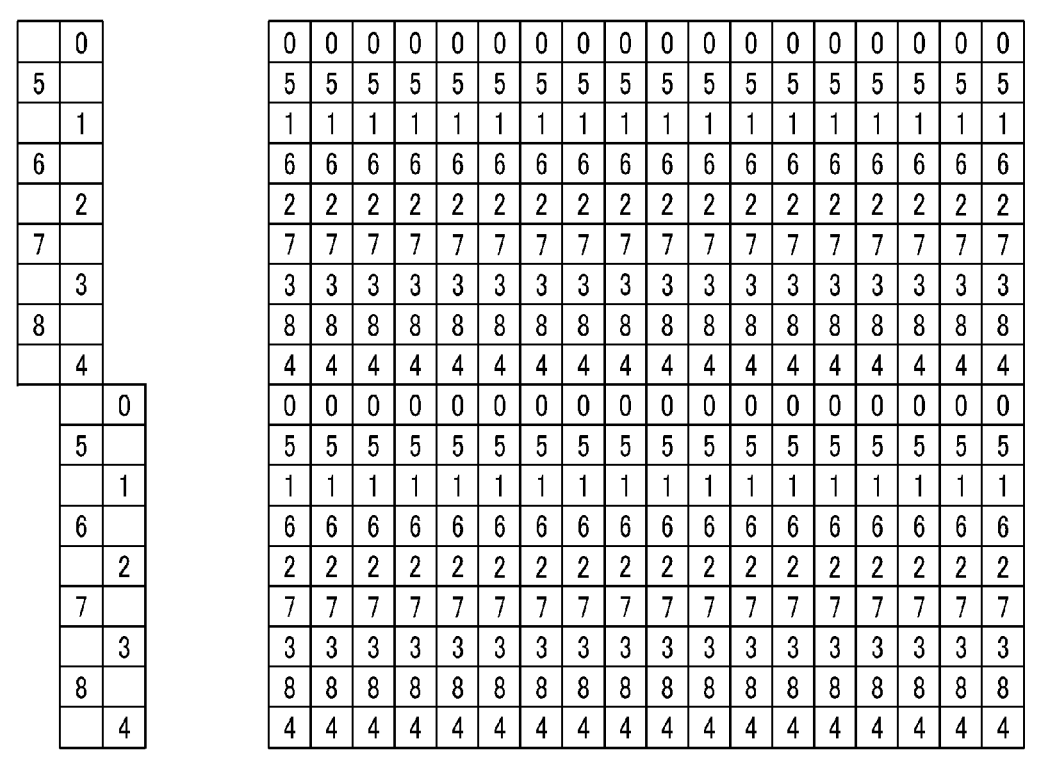

FIG. 13 is a diagram illustrating one example of the nozzle pattern. The nozzle pattern illustrated in FIG. 13 is an example of the nozzle pattern corresponding to the dither mask of 18×18 pixels in the case that the recording resolution is 600 dpi×600 dpi, the nozzle array density is 300 npi, the number of the nozzles is nine, a paper feed amount is 9/600 dpi, and the number of paths in the main scanning direction is 1. That is, the nozzle pattern illustrated in FIG. 13 illustrates the nozzle numbers corresponding to the individual pixels of the dither mask of 18×18 pixels in the scanning pattern in the case of performing intermittent feed of relatively moving, by nine pixels each in the sub scanning direction, the nozzle array 61A (see FIG. 12) for which the nozzle pitch in the sub scanning direction is two pixels and the number of the nozzles is nine, and scanning a scanning line of one line in the main scanning direction by the single (the same one) nozzle. For example, the pixel to which the nozzle number 0 is entered in FIG. 13 is the pixel for which the nozzle of the nozzle number 0 is in charge of the recording, and indicates the recording attending pixel of the nozzle of the nozzle number 0. That is, the nozzle pattern indicates the recording attending pixel for each nozzle number.

The nozzle pitch being two pixels means that the nozzle pitch corresponds to a distance for two pixels in the sub scanning direction, with the size of one pixel determined from the recording resolution during printing as a unit. For example, the nozzle array density 300 npi of the recording head 24A described in FIG. 12 corresponds to 300 dpi in terms of a dot recording density (resolution). That is, in this example, the recording resolution assumed during printing is 600 dpi in the main scanning direction and 600 dpi in the sub scanning direction, and the nozzle pitch of the nozzle array 61A of 300 npi corresponds to two pixels with the size of the pixel of 600 dpi as a unit.

Figure 14:
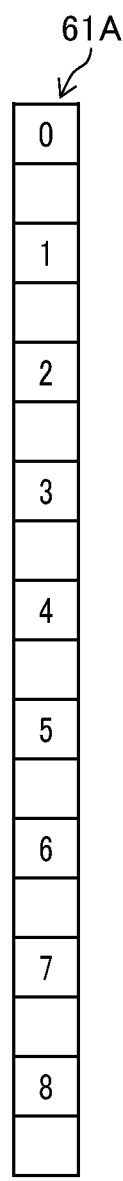
FIG. 14 is an explanatory diagram for explaining a description method of a nozzle array.

Here, in order to easily understandably illustrate the relation between the positions of the individual nozzles 62 configuring the nozzle array 61A and the positions of the individual pixels of the dither mask, a describing method as illustrated in FIG. 14 is introduced regarding the description of the nozzle array. In FIG. 14, the nozzle array 61A is sectioned into cells of a pixel unit, and numbers 0-8 indicating the nozzle numbers are described inside the cells. The positions of the cells to which the nozzle numbers are attached indicate the positions of the nozzles. That is, the description of the nozzle array 61A illustrated in FIG. 14 is replaced the description of the recording head 24A illustrated in FIG. 12.

Figure 15:
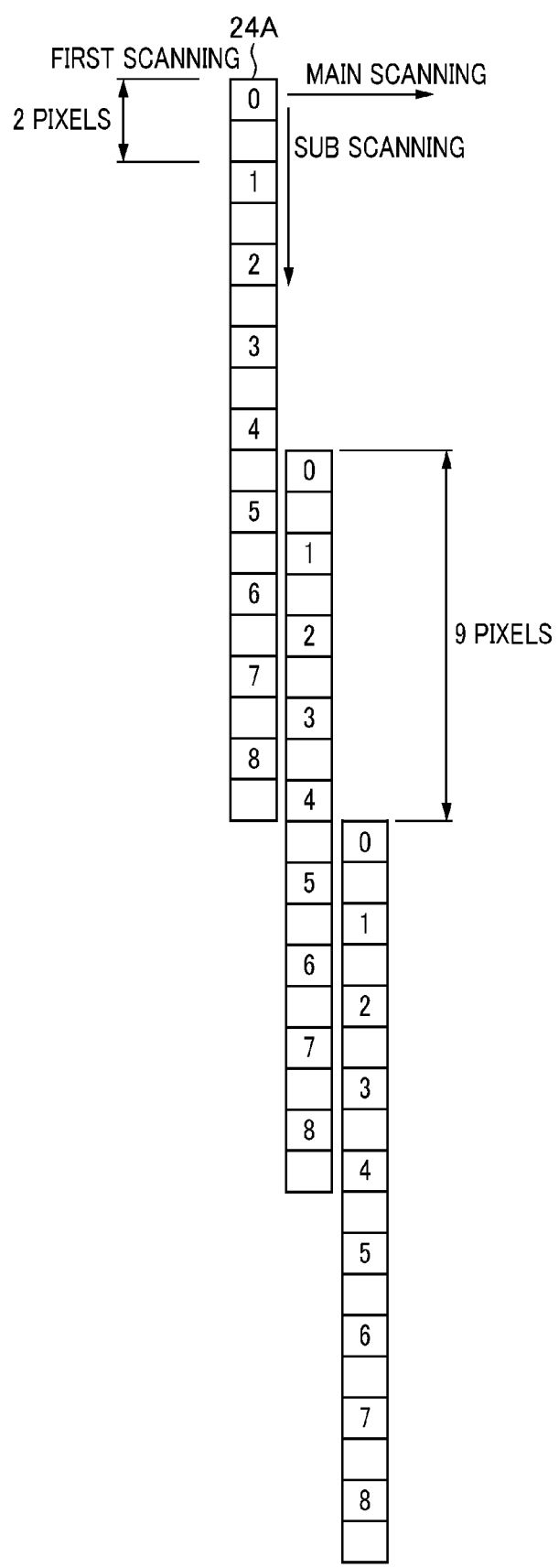
FIG. 15 is an explanatory diagram illustrating a specific example of a multipath type drawing method.

FIG. 15 illustrates a situation of the intermittent feed of relative movement by nine pixels each in the sub scanning direction every time the print path in the main scanning direction is executed once. For the convenience of the illustration, similarly to FIG. 6, FIG. 15 is illustrated assuming that the recording head 24A is moved in the sub scanning direction to the stopped recording medium.

In an image drawing method illustrated in FIG. 15, the recording of 600 dpi is completed by one path for a main scanning line which is a deposition point line in the main scanning direction, and the recording of 600 dpi is completed by two paths for a sub scanning line which is a deposition point line in the sub scanning direction. A paper feed amount in the sub scanning direction is nine pixels. The nozzle pattern of the image drawing method of repeating such scanning is illustrated in FIG. 13. On a left side of the nozzle pattern of 18×18 pixels in FIG. 13, the image drawing method (scanning pattern) by the nozzle array 61A with nine nozzles of the nozzle numbers 0 to 8 is schematically illustrated.

After setting the nozzle pattern in step S16 in FIG. 10, the process advances to step S18 in FIG. 10 next. In step S18, the dot priority pixels are set based on the nozzle relative ejection rates of the stage Q set in step S14 and the nozzle pattern set in step S16. Step S18 corresponds to one form of "dot priority pixel setting process". The dot priority pixels are a pixel group to be candidates of the pixel to set the threshold among the pixels of the dither mask.

FIG. 16 is a diagram illustrating the arrangement of the dot priority pixels. FIG. 16 illustrates an arrangement example of the dot priority pixels set based on the nozzle relative ejection rates of the stage Q=1 described in FIG. 11 and the nozzle pattern described in FIG. 13. In FIG. 16, for the dot priority pixels, a graph of a numeral "1" is attached and cells indicating the pixels are painted with a gray tone. Also, a numeral "0" is attached to dot non-priority pixels. That is, it is indicated that the pixels to which "1" is attached in a matrix area of 18×18 pixels are dot priority pixel ON, and pixels to which "0" is attached are dot priority pixel OFF.

Also, in FIG. 16, together with the arrangement example of the dot priority pixels, the nozzle numbers of the nozzles that record individual rasters, the nozzle relative ejection rates, and the number of dot priority pixels of the individual rasters are indicated together. "Raster" here is a main scanning direction raster in which the pixels are arranged in the main scanning direction which is a horizontal direction (row direction) of FIG. 16.

The number of dot priority pixels of the individual rasters are obtained by multiplying the nozzle relative ejection rate of the nozzle that records the pertinent raster by "number of main scanning pixels of dither mask/main scanning direction path number". The number of main scanning pixels of the dither mask is the number of the pixels in the main scanning direction of the dither mask. In the case of the example in FIG. 16, since the number of main scanning pixels of the dither mask is 18 pixels and the main scanning direction path number is "1", "number of main scanning pixels of dither mask/main scanning direction path number" is 18 pixels. The raster of the first row illustrated in FIG. 16 is recorded by the main scanning direction path number "1" by the nozzle of the nozzle number 0, and the nozzle relative ejection rate of the nozzle number 0 is 0.2. Therefore, the number of dot priority pixels of the raster of the first row is calculated as 0.2×18/1=3.6.

The number of dot priority pixels of the whole in the mask size of the dither mask is a total sum of the number of dot priority pixels of the individual nozzles of the individual rasters obtained by multiplying the nozzle relative ejection rates of the individual nozzles that record the individual rasters by "number of main scanning pixels/main scanning direction path number" of the dither mask. The dot priority pixels of the individual nozzles of the individual rasters are set so that a generation probability of the dot priority pixels is proportional to the nozzle relative ejection rate.

<First Example of Setting Method of Dot Priority Pixels>

The dot priority pixels in the individual rasters are set according to the following conditional expression, for example.

rand( )≤nozzle relative ejection rate  [Conditional expression 1]

The dot priority pixel is ON only when the conditional expression is satisfied.

Note that "rand( )" in the conditional expression 1 is a random number in a range equal to or larger than 0 and smaller than 1.

At individual pixel positions, the random number in the range equal to or larger than 0 and smaller than 1 is generated with the equal probability by a rand( ) function, rand( ) which is a generated random number value and the nozzle relative ejection rate are compared, and in the case that rand( ) is equal to or smaller than the nozzle relative ejection rate, the pixel is defined as the dot priority pixel.

By determining the dot priority pixel according to the conditional expression 1, in the individual raster to be recorded by the individual nozzles, the number of "nozzle relative ejection rate×number of main scanning pixels/main scanning direction path number" is turned to a target number, and the dot priority pixels are set randomly.

The number of dot priority pixels calculated by "nozzle relative ejection rate×number of main scanning pixels/main scanning direction path number" and the number of the dot priority pixels actually set according to the conditional expression 1 do not necessarily coincide.

That is, the number of dot priority pixels of the individual rasters illustrated in FIG. 16 are the target number of dot priority pixels in the individual rasters, and can be obtained beforehand by calculation as described above. However, the number of the dot priority pixels to be actually set may vary depending on the value of the random number.

<Second Example of Setting Method of Dot Priority Pixels>

Other than using the conditional expression 1, there are various methods as a method of randomly setting the dot priority pixels. For example, the number of priority pixels to set in the individual raster to be recorded by the individual nozzles is obtained by an integer value first, and then the first dot priority pixel is set to the pixel of a number corresponding to an integer obtained by "rand( )RAND_MAX % number of recording pixels". Here, the "number of recording pixels" is the number of the pixels for which the individual nozzles are in charge of the recording in the individual rasters, and is equal to "number of main scanning pixels/main scanning direction path number". "rand( )RAND_MAX" is a random number of an integer in a range equal to or larger than 0 and smaller than RAND_MAX. "RAND_MAX" is an integer at least larger than the number of recording pixels. For example, it can be RAND_MAX=65536. "%" is a modulus operator. "a % b" indicates a remainder of dividing a by b. That is, rand( )RAND_MAX % number of recording pixels is the number of the remainder of dividing the random number of the integer in the range equal to or larger than 0 and smaller than RAND_MAX by the "number of recording pixels". By this operation, the integer in the range equal to or larger than 0 and equal to or smaller than the "number of recording pixels−1" can be obtained with the equal probability. In the example in FIG. 16, it is "number of recording pixels=18".

The integers 0 to 17 are made to correspond to pixel numbers of 18 pixels, and the pixel number corresponding to the integer obtained by "rand( )RAND_MAX % number of recording pixels" is defined as the first dot priority pixel.

Next, excluding the first dot priority pixel, the second dot priority pixel is set to the pixel of the number corresponding to the integer obtained by rand( )RAND_MAX % (number of recording pixels−1). In the example in FIG. 16, it is "number of recording pixels=18", the integers 0 to 16 are made to correspond to the pixel numbers of 17 pixels excluding the first dot priority pixel, and the pixel number corresponding to the integer obtained by rand( )RAND_MAX % (number of recording pixels−1) is defined as the second dot priority pixel. Similarly hereinafter, excluding the first and second dot priority pixels, the third dot priority pixel is set to the pixel of the number corresponding to the integer obtained by rand( )RAND_MAX % (number of recording pixels—2). The fourth and succeeding dot priority pixels can be also set successively by the similar procedure for the number of dot priority pixels.

When setting the dot priority pixels, the pixels of the thresholds set by the previous stage may be considered or may not be considered. In the setting of the dot priority pixels, in the case of considering the pixels of the thresholds set by the previous stage, in the already-described setting method by the second example, the pixels of the thresholds set by the previous stage are excluded from the pixels to be the candidates of the dot priority pixels in the pertinent stage, and the number of thresholds is excluded from the number of dot priority pixels.

Regarding the setting method of the dot priority pixels, examples of using the rand( ) function are illustrated in the first example and the second example, however, there are various methods as the method of randomly setting the dot priority pixels, and it is not limited to the form of using the rand( ) function.

<Third Example of Setting Method of Dot Priority Pixels>

Also, the setting method of the dot priority pixels is not limited to the method of randomly setting them, and a method of setting them at regular intervals is also possible. An example of a method of setting the dot priority pixels at regular intervals is described hereinafter.

For example, ejection pixel intervals of the individual nozzles in the individual rasters are defined as 1, "1/nozzle relative ejection rate" is determined as the regular interval, and the dot priority pixel may be set to the pixel of the number for which a value of an integral multiple of "1/nozzle relative ejection rate" is rounded to an integer value. The ejection pixel interval is an interval of ejection of the individual nozzles in the individual rasters, and corresponds to one pixel when the main scanning direction path number is 1, and 2 pixels when the main scanning direction path number is 2.

For example, since the nozzle relative ejection rate is 0.8 for the raster of the second row in FIG. 16, the dot priority pixel is to be set to the pixel of the number for which the value of the integral multiple of 1/nozzle relative ejection rate=1/0.8=1.25 is rounded to the integer value. Here, since the main scanning direction path number is 1 in FIG. 16, "1" of the ejection pixel interval corresponds to one pixel. Therefore, for example, in the case that a method of rounding the integer value is not rounding-down or rounding-up but rounding-off, with the pixel at a left end as the first, the dot priority pixels are to be set to the first, third, fourth, fifth, sixth, eighth, ninth, 10th, 11th, 13th, 14th, 15th, 16th and 18th pixels (the pixels of the numbers for which 1.25, 2.5, 3.75, 5, 6.25, 7.5, 8.75, 10, 11.25, 12.5, 13.75, 15, 16.25 and 17.5 are rounded to the integer values by rounding-off).

In this case, the dot priority pixel may be set to the 19th pixel for which 18.75 is rounded to the integer value by rounding-off further. However, since the 19th pixel exceeds "18" which is the number of main scanning pixels of the dither mask, it is to be set to the first pixel, returning to the left end again, but the dot priority pixel is already set to the first pixel here so that the dot priority pixel is to be set to the second pixel on the side, the right side for example.

After the dot priority pixels are set in step S18 in FIG. 10 using the methods described in the first example to the third example above or the like, the process advances to step S20.

In step S20, the thresholds are temporarily set to the pixels that are the threshold non-set and dot priority pixels among the entire pixels of the dither mask, and the graininess is evaluated. For an index of graininess evaluation, for example, a known index such as RMS (Root Mean Square) graininess can be used. The RMS graininess is a standard deviation calculated by applying a blur filter for which a human visual characteristic such as VTF (Visual Transfer Function) is taken into consideration to the dot arrangement.

An evaluation result of the graininess in step S20 is stored in a memory or the like, and the process advances to step S22. In step S22, whether or not the evaluation of the graininess in step S20 is completed for the entire candidate pixels which are the candidates of the pixels to set the threshold is determined. The entire candidate pixels are a set of the threshold non-set and dot priority pixels to which the threshold can be temporarily set in step S20.

In step S22, in the case that there is the candidate pixel for which the graininess is not evaluated, determination in step S22 becomes No determination and the process returns to step S20. That is, the pixel to temporarily set the threshold is changed in the range of the candidate pixels which are the threshold non-set and dot priority pixels, and the processing of step S20 is repeated.

When the processing of the graininess evaluation in step S20 is completed for the entire candidate pixels, the determination in step S22 becomes Yes determination, and the process advances to step S24.

In step S24, based on a result of evaluating the graininess respectively for the entire candidate pixels, the threshold is set to the pixel with the best graininess. The process in step S24 corresponds to one form of "threshold setting process".

Next, in step S26, whether or not the setting of the predetermined number of thresholds is completed is determined. The "predetermined number" here is a specific value determined beforehand as the number of thresholds to be set under the setting of the nozzle relative ejection rate of the same stage. The "predetermined number" in the flowchart illustrated in FIG. 10 is a number smaller than the entire number of dot priority pixels set in step S18, for example, the number of all dot priority pixels×0.8. If the predetermined number is set to be equal to the number of all dot priority pixels, there is a risk that the graininess is deteriorated around the predetermined number. By setting the predetermined number to be smaller than the number of all dot priority pixels, graininess deterioration can be reduced. However, when the predetermined number is set to be excessively small, a performance of suppressing the ejection rate of the end part nozzle in the nozzle array is lowered. Therefore, when setting the predetermined number, it is preferable to set it at an appropriate value from a viewpoint of compatibly achieving reduction of the graininess deterioration and the performance of suppressing the ejection rate of the end part nozzle. For example, the predetermined number is in the range equal to or larger than 0.6 times and equal to or smaller than 0.9 times of the number of all dot priority pixels, and more preferably in the range equal to or larger than 0.7 times and equal to or smaller than 0.8 times.

In the case that the setting of the predetermined number of thresholds is not completed in step S26, the process returns to step S20. On the other hand, when the setting of the predetermined number of thresholds is completed in step S26, the process advances to step S28.

In step S28, whether or not the processing of the entire stages is completed is determined. For the stage Q of the nozzle relative ejection rate, when the processing of the entire stages is not completed, 1 is added to the value of the stage Q, the value of the stage Q is changed to "Q+1" (step S30), and the process returns to step S14.

The setting is changed to the nozzle relative ejection rates of the next stage changed in step S30, and the above-described processing loop (step S14 to step S28) is repeated. For the nozzle pattern described in step S16, since the same setting as the previous time can be utilized, the processing of step S16 can be omitted.

A process of newly setting the dot priority pixel in step S18 under the setting of the nozzle relative ejection rates the stage different from the previous time through step S30 corresponds to one form of "process of changing dot priority pixel".

By repetition of a loop from step S14 to step S28 through step S30, the setting of the nozzle relative ejection rate for each nozzle set by the nozzle relative ejection rate setting process of step S14 is changed in a plurality of stages, at least two stages, according to a threshold area that corresponds to the number of thresholds corresponding to the predetermined number of thresholds in step S26 (that is, by a value of the threshold set in step S24).

Also, before the thresholds are set to all the dot priority pixels tentatively set in step S18, that is, when the setting of the predetermined number of thresholds smaller than the number of dot priority pixels is completed, the setting is changed to the different setting of the dot priority pixel in step S18 newly through step S30.

In such a manner, the similar processing is performed for all the stages, and the individual thresholds are set. When the processing is completed in all the stages in step S28, the flowchart in FIG. 10 is ended.

Regarding step S28, the nozzle relative ejection rates of all the nozzles are set to "1.0" in the final stage, the dot priority pixels are set to all the pixels, and the entire number of pixels is set to the "predetermined number" in step S26.

Instead of the flowchart illustrated in FIG. 10, the threshold setting may be turned to a different loop and the setting and determination of the dot priority pixels may be omitted only for the final stage. That is, in the case of setting all the nozzle relative ejection rates of all the nozzles to "1.0" in the final stage, without executing the processing of intentionally setting the nozzle relative ejection rates of the individual nozzles to "1.0" and setting all the pixels to the dot priority pixels, the configuration may be adopted in which the setting of the nozzle relative ejection rates and the setting of the dot priority pixels are excluded, and simply a different processing loop of not even determining the dot priority pixels is executed.

Even in the case of adopting such a different processing loop it is practically equal to perform the processing of setting the nozzle relative ejection rates of all the nozzles to "1.0" and setting all the pixels to the dot priority pixels, and shift to the different processing loop corresponds to one form of the setting of "final stage" in "plurality of stages".

The flowchart described in FIG. 10 is applied regarding the setting of some thresholds among all the thresholds to be set to the dither mask. That is, the processing of changing the tentatively set dot priority pixels is applied regarding the setting of at least some thresholds among all the thresholds.

According to the flowchart in FIG. 10, the nozzle ejection rates of the individual nozzles can be increased while roughly keeping the relative ratio of ejection of the individual nozzles according to the nozzle relative ejection rate (that is, the priority pixel setting rate) together with the increase of the thresholds to be set. "Relative ratio of ejection of individual nozzles" here corresponds to the nozzle relative ejection rate but cannot be completely equal.

[Configuration of Dither Mask Generation Device]

Figure 17:
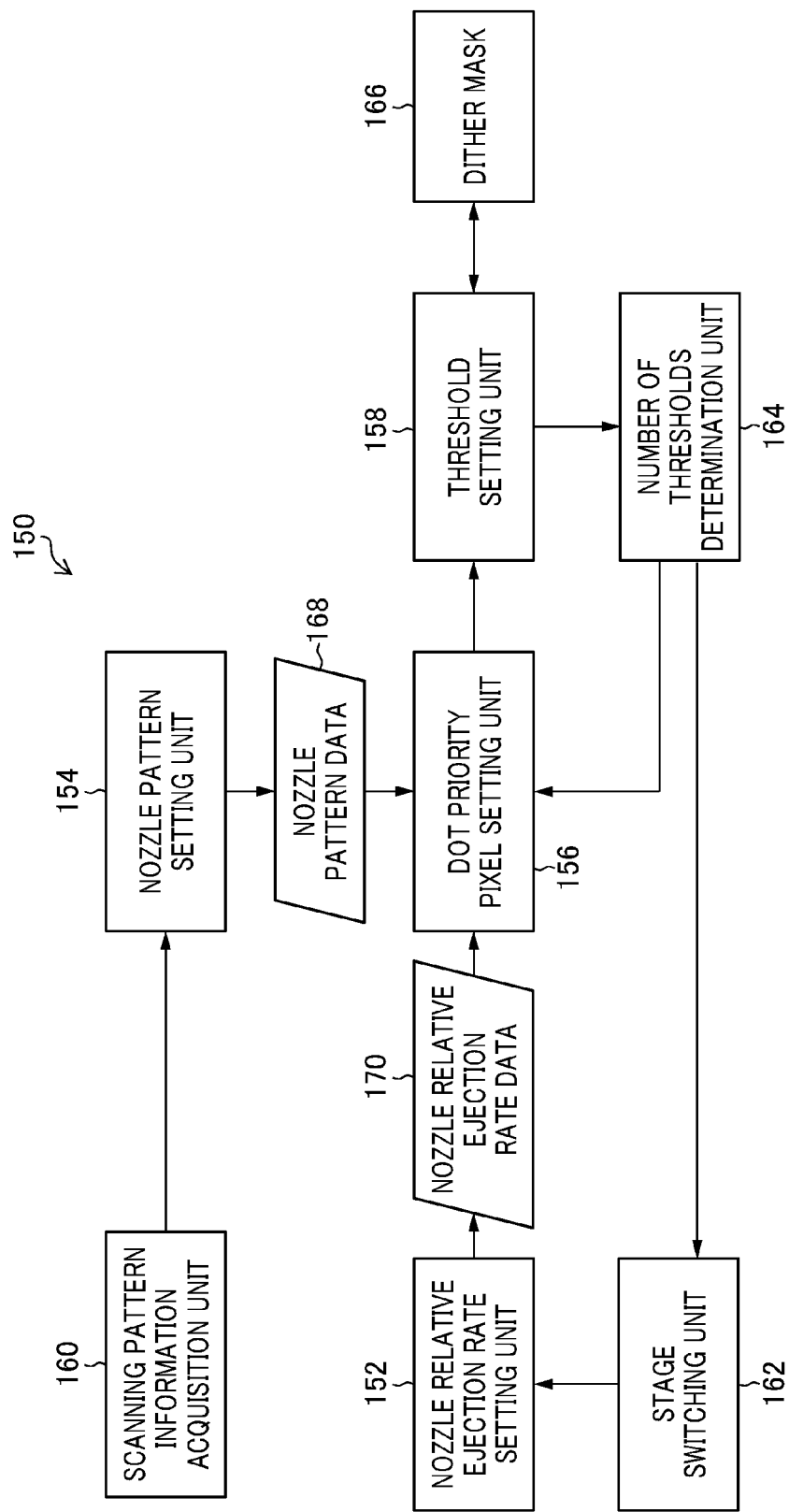
FIG. 17 is a block diagram of a dither mask generation device relating to the first embodiment.

FIG. 17 is a block diagram of a dither mask generation device relating to the first embodiment. A dither mask generation device 150 includes a nozzle relative ejection rate setting unit 152, a nozzle pattern setting unit 154, a dot priority pixel setting unit 156, and a threshold setting unit 158. Also, the dither mask generation device 150 has a scanning pattern information acquisition unit 160, a stage switching unit 162, and a number of thresholds determination unit 164. These individual units can be achieved by a hardware circuit such as an integrated circuit, or hardware and software of a computer, or an appropriate combination thereof. Also, a function of the dither mask generation device 150 may be loaded on the controller 102 described in FIG. 5.

The nozzle relative ejection rate setting unit 152 illustrated in FIG. 17 performs processing of setting the nozzle relative ejection rate for each nozzle in the recording head 24 (see FIG. 4). The nozzle relative ejection rate setting unit 152 sets the nozzle relative ejection rate for each nozzle according to the prepared stage of the nozzle relative ejection rate as illustrated in FIG. 11. The nozzle relative ejection rate setting unit 152 performs the processing described in step S14 in FIG. 10. The nozzle relative ejection rate setting unit 152 corresponds to one form of "priority pixel setting rate setting unit".

The stage switching unit 162 illustrated in FIG. 17 specifies the stage of the nozzle relative ejection rate set in the nozzle relative ejection rate setting unit 152. The stage switching unit 162 performs the processing described in step S30 in FIG. 10. The nozzle relative ejection rate setting unit 152 sets the nozzle relative ejection rate of the stage specified by the stage switching unit 162.

The nozzle pattern setting unit 154 performs processing of specifying the nozzles corresponding to the individual pixels of a dither mask 166, based on the information of the scanning pattern obtained from the scanning pattern information acquisition unit 160. That is, the nozzle pattern setting unit 154 performs processing of making at least one nozzle in charge of the recording at the respective pixel positions correspond, for the individual pixels of the dither mask 166.

The scanning pattern information acquisition unit 160 acquires the information of the scanning pattern according to the image drawing mode from the scanning pattern program or the like. As described above, since the scanning pattern program defines the reciprocating scanning in the main scanning direction by the recording head 24 to the recording medium 12 intermittently conveyed in the sub scanning direction and the number of the paths, the scanning pattern of the recording head 24 can be discriminated from the scanning pattern program.

The nozzle pattern setting unit 154 discriminates the scanning pattern when the recording head 24 is relatively moved in the main scanning direction and the sub scanning direction to the recording medium 12. The nozzle pattern setting unit 154 performs processing of determining by which nozzle 62 of the recording head 24 the individual pixels of the dither mask 166 are to be recorded based on the scanning pattern. The nozzle pattern setting unit 154 generates nozzle pattern data 168 which is the data of the nozzle pattern indicating correspondence relation between the individual pixels of the dither mask 166 and the nozzles in charge of the recording of the respective pixels. The nozzle pattern data 168 is the data of the nozzle pattern described in FIG. 13. The nozzle pattern setting unit 154 performs the processing described in step S16 in FIG. 10.

The method of generating the nozzle pattern data 168 is not limited to the method of determining it based on the scanning pattern program, and various kinds of methods can be used. Since the nozzle pattern data 168 can be determined by the image drawing mode and the size and arrangement method of the dither mask 166, the nozzle pattern data corresponding to each of the plurality of kinds of the image drawing modes can be held beforehand in the information storage unit such as a memory.

The dot priority pixel setting unit 156 performs processing of setting the dot priority pixels, based on nozzle relative ejection rate data 170 and the nozzle pattern data 168. Also, the dot priority pixel setting unit 156 performs processing of changing the dot priority pixels before the thresholds are set to all the tentatively set dot priority pixels. Changing the dot priority pixels before the thresholds are set to all the tentatively set dot priority pixels means changing the dot priority pixels in the state that some pixels among the tentatively set dot priority pixels are the threshold non-set pixels. The dot priority pixel setting unit 156 performs the processing described in step S18 in FIG. 10.

The threshold setting unit 158 prepares the dither mask 166 including the threshold non-set pixels, and performs processing of setting the thresholds to the threshold non-set pixels of the dither mask 166. The threshold setting unit 158 performs the processing described in step S20 to step S24 in FIG. 10. By setting the thresholds of all the pixels of the dither mask 166 by the threshold setting unit 158, the dither mask 166 which is a generation target is completed.

The number of thresholds determination unit 164 manages the number of thresholds set by the threshold setting unit 158, and determines whether or not the setting of the predetermined number of the thresholds is completed. The number of thresholds determination unit 164 performs the processing described in step S26 in FIG. 10.

A determination result of the number of thresholds determination unit 164 is notified to the dot priority pixel setting unit 156. The dot priority pixel setting unit 156 performs the processing of changing the dot priority pixels, based on the information obtained from the number of thresholds determination unit 164.

Also, the determination result of the number of thresholds determination unit 164 is notified to the stage switching unit 162. The stage switching unit 162 performs the processing of changing the stage of the nozzle relative ejection rate, based on the information obtained from the number of thresholds determination unit 164.

The function of the nozzle relative ejection rate setting unit 152 corresponds to one form of "priority pixel setting rate setting function". The function of the nozzle pattern setting unit 154 corresponds to one form of "nozzle pattern setting function". The function of the dot priority pixel setting unit 156 corresponds to one form of "dot priority pixel setting function" and "function of changing dot priority pixels". The function of the threshold setting unit 158 corresponds to one form of "threshold setting function".

Using the dither mask generated by the present embodiment, the halftone processing of the image data for printing is performed. On the basis of the halftone image generated in this way, the ejection of the individual nozzles of the recording head 24 is controlled. Thus, generation of image defects such as banding, stripes or irregularity can be suppressed, and high-quality print images are obtained.

Second Embodiment

The second embodiment which is a modification of the first embodiment described above is described.

Figure 18:
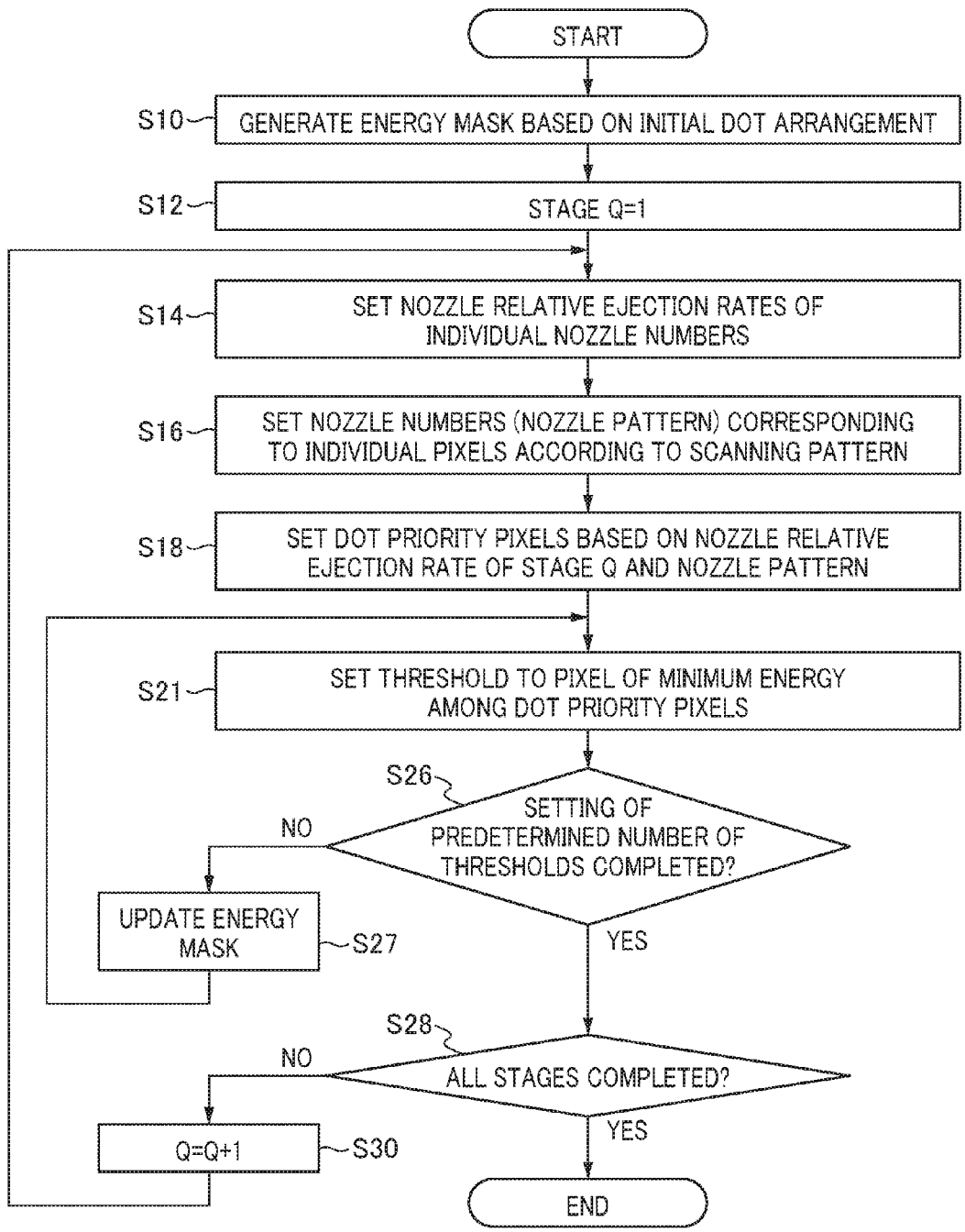
FIG. 18 is a flowchart illustrating an example of ascending order threshold setting processing by a second embodiment.

FIG. 18 is a flowchart illustrating an example of ascending order threshold setting processing by the second embodiment. Instead of the flowchart described in FIG. 10, the flowchart illustrated in FIG. 18 can be applied. In FIG. 18, the same step numbers are attached to the processes that are the same as or similar to that in the flowchart described in FIG. 10, and the description is omitted.

In the example illustrated in FIG. 18, as a setting method of the thresholds after setting the dot priority pixels, a technique of a void-and-cluster method is used. The void-and-cluster method is described, for example, in Robert A. Ulichney "Void-and-cluster method for dither array generation", Proc. SPIE 1913, Human Vision, Visual Processing, and Digital Display IV, 332 (Sep. 8, 1993).

In the flowchart in FIG. 18, the setting of the dot priority pixels and the technique of the void-and-cluster method are combined, and processing of determining the pixels to set the thresholds from the threshold non-set pixels and setting the thresholds is performed.

That is, as illustrated in FIG. 18, an energy mask for which a blur filter such as a Gaussian filter is added around the pixels corresponding to the individual dots of the initial dot arrangement is generated first (step S10).

After the processing from step S12 to step S18, in step S21, the threshold is set to the pixel of the minimum energy among the dot priority pixels.

After step S21, whether or not the setting of the predetermined number of the thresholds is completed is determined in step S26. In the case of No determination in step S26, the process advances to step S27, and the energy mask is updated.

That is, in step S27, the energy mask is updated by adding the blur filter around the pixel corresponding to the threshold accompanying the setting of the threshold. After the processing in step S27, the process returns to step S21.

The processing from step S21 to step S27 is looped until the setting of the predetermined number of the thresholds is completed. When the setting of the predetermined number of the thresholds is completed, it becomes Yes determination in step S26, and the process advances to step S28.

In the case of the flowchart in FIG. 18, the index of the graininess evaluation is individual pixel values themselves of the energy mask corresponding to the thresholds of the previous time. Therefore, it is not needed to temporarily set the threshold as described in step S20 in FIG. 10 or to calculate the index of the graininess evaluation every time the threshold is temporary set. In the case of the ascending order, the pixel of the minimum energy is determined as the pixel of the best graininess.

In the first embodiment and the second embodiment described above, one kind of the dot priority pixel is set for the nozzle relative ejection rate (that is, the priority pixel setting rate) of the same stage. Then, before the end of the setting of the thresholds to all the dot priority pixels of one kind relating to the setting of the same stage, the stage of the nozzle relative ejection rate is switched, and the dot priority pixels are also changed accompanying the change of the setting of the nozzle relative ejection rate.

However, when implementing the invention, a form of setting the plurality of different kinds of dot priority pixels for the nozzle relative ejection rate (that is, the priority pixel setting rate) of the same stage is also possible. By switching and setting the plurality of kinds of the dot priority pixels even for the nozzle relative ejection rate of the same stage, the excellent graininess can be maintained regardless of the setting of the "predetermined number" in step S26.

Third Embodiment

In the third embodiment, the form of switching and setting the plurality of kinds of dot priority pixels for the nozzle relative ejection rate of the same stage is described.

Figure 19:
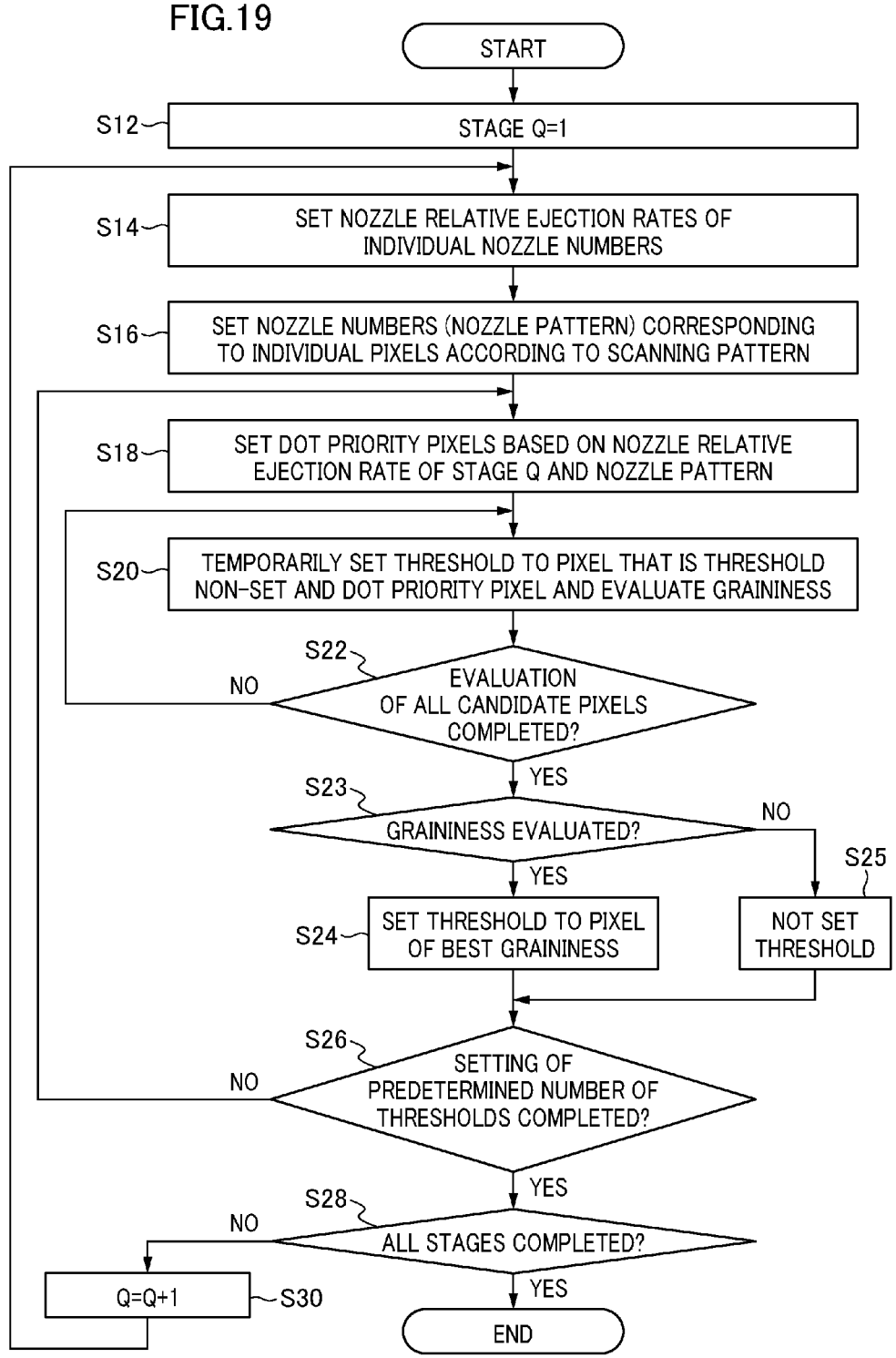
FIG. 19 is a flowchart illustrating an example of ascending order threshold setting processing by a third embodiment.

FIG. 19 is a flowchart illustrating an example of ascending order threshold setting processing by the third embodiment. Instead of the flowchart described in FIG. 10, the flowchart illustrated in FIG. 19 can be applied. In FIG. 19, the same step numbers are attached to the processes that are the same as or similar to that in the flowchart described in FIG. 10, and the description is omitted.

In the flowchart in FIG. 19, the configuration is such that, in the case of "No determination" in step S26, the process returns to step S18, and the dot priority pixels are set again. Also, between step S22 and step S24, a process (step S23)

of determining whether or not the graininess can be evaluated is added, and processing (step S25) in the case that the graininess cannot be evaluated is included.

That is, in the example in FIG. 19, every time the threshold is set in step S24, the process returns from No determination in step S26 to step S18, and the setting of the dot priority pixels is changed. Thus, the threshold non-set pixels are included in the dot priority pixels regardless of the number of the already set thresholds, and the arrangement of the dot priority pixels is changed from the time of setting the thresholds in the previous time so that the excellent graininess is maintained.

Of course, since it is possible that all the dot priority pixels are included in the pixels of the already set thresholds, processing in the case that the evaluation of the graininess is impossible in step S20 is also needed. That is, in step S23, whether or not the graininess is evaluated is determined after step S22, and in the case that there is not even one pixel for which the graininess can be evaluated, that is, in the case that there is not even one pixel that is "threshold non-set and dot priority pixel" (in the case of No determination in step S23), the threshold is not set (step S25), the process returns to step S18 through determination in step S26, and the setting of the dot priority pixels is repeated in step S18.

The third embodiment illustrated in FIG. 19 is a form of successively updating the dot priority pixels every time the threshold is set under the setting of the nozzle relative ejection rate of the same stage. Also in the third embodiment, the dot priority pixels are changed before the thresholds are set to all the dot priority pixels that are already tentatively set. The dot priority pixels are changed to the new ones every time the threshold is set. Changing the dot priority pixels to the new ones before the thresholds are set to all the already set dot priority pixels is in the concept of "changing dot priority pixels".

In the case of the flowchart illustrated in FIG. 19, even when the "predetermined number" in step S26 is set to a value larger than the number of dot priority pixels, the thresholds can be set to the predetermined number while keeping the excellent graininess.

However, as a setting method of the dot priority pixels in step S18, in the case of excluding the pixels of the already set thresholds from the dot priority pixels of the thresholds and excluding the number of pixels of the already set thresholds from the number of dot priority pixels as described in a fourth example to be described later, the "predetermined number" cannot be set to the value larger than the number of dot priority pixels. If the "predetermined number" is set to the value larger than the number of dot priority pixels, the loop by the determination in step S26 is not completed and it becomes an error. Also, by switching the dot priority pixels in step S18, the graininess is improved compared to a conventional technique, but the graininess is deteriorated as the number of the thresholds approaches the number of dot priority pixels. However, a control performance of the ejection rate of the nozzle is improved by considering the pixels of the already set thresholds and the number of pixels and setting the dot priority pixels, compared to the case of not considering them.

<Fourth Example of Setting Method of Dot Priority Pixels>

Here, the fourth example of the setting method of the dot priority pixels is described. The fourth example is an example of a method of reflecting the already set thresholds on the setting of the dot priority pixels.

First, the number of dot priority pixels to be set in the individual raster to be recorded by the individual nozzles is obtained by the integer value, and the number of already set thresholds is subtracted from the integer value.

Next, the first dot priority pixel is set to the pixel of the number corresponding to an integer obtained by rand( )RAND_MAX % (number of recording pixels-already set threshold number), excluding the pixels of the already set thresholds in the individual rasters to be recorded by the individual nozzles. Here, the "number of recording pixels" is the number of the pixels for which the individual nozzles are in charge of the recording in the individual rasters, and is equal to "number of main scanning pixels/main scanning direction path number".

Next, the second dot priority pixel is set to the pixel of the number corresponding to the integer obtained by rand( )RAND_MAX % (number of recording pixels−already set threshold number−1), excluding the pixels of the already set thresholds and the first dot priority pixel.

Next, the third dot priority pixel is set to the pixel of the number corresponding to the integer obtained by rand( )RAND_MAX % (number of recording pixels−already set threshold number−2), excluding the pixels of the already set thresholds and the first and second dot priority pixels. The fourth and succeeding dot priority pixels can be also set successively by the similar procedure for the number of dot priority pixels.

According to the fourth example, the pixels other than the pixels of the already set thresholds are set to the dot priority pixels.

Fourth Embodiment

The fourth embodiment which is a modification of the third embodiment described above is described. Without setting the dot priority pixels in step S18 in FIG. 19, whether or not an object pixel is the dot priority pixel may be determined at any time in step S20.

Figure 20:
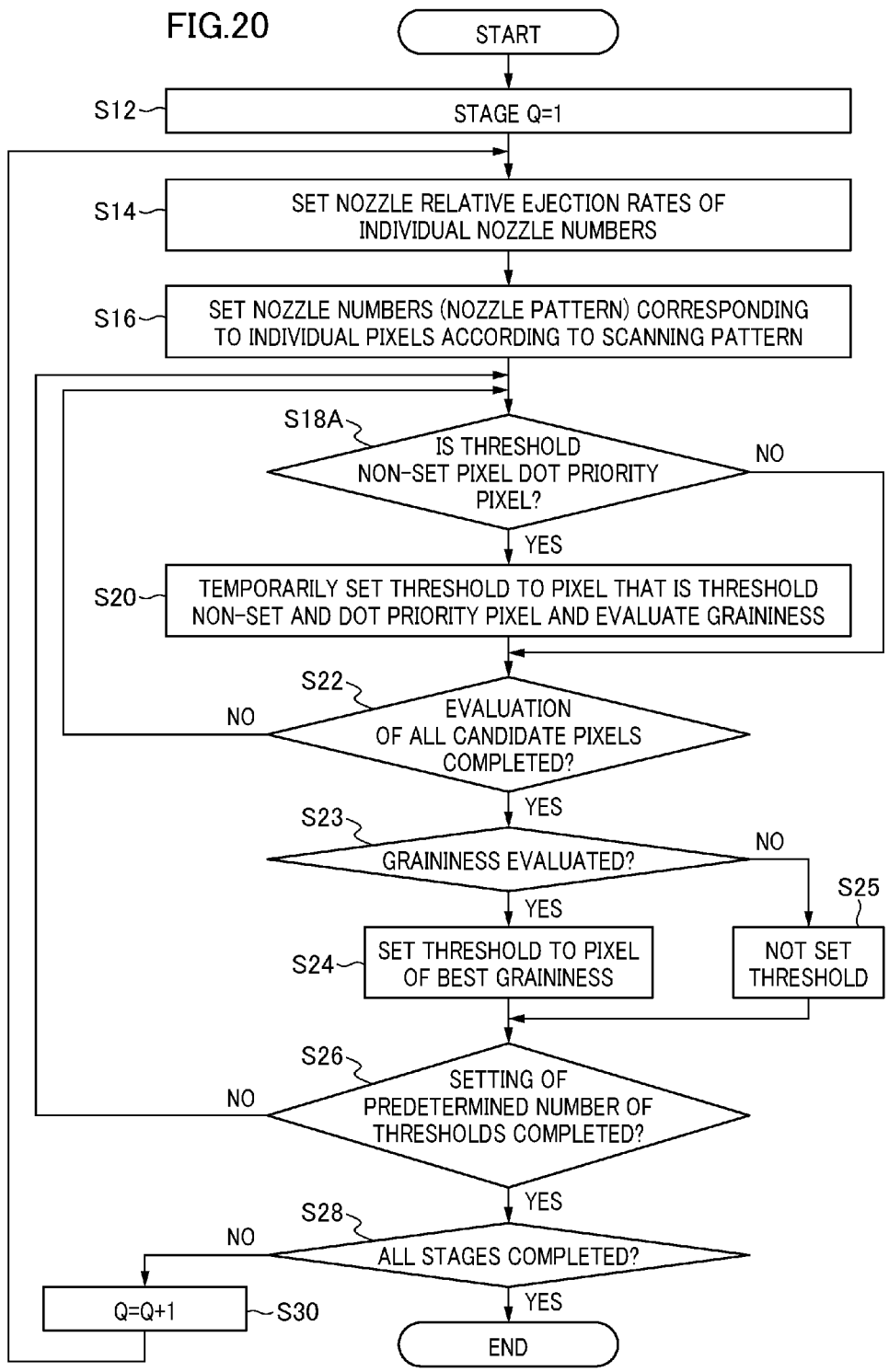
FIG. 20 is a flowchart illustrating an example of ascending order threshold setting processing by a fourth embodiment.

FIG. 20 is a flowchart illustrating an example of ascending order threshold setting processing by the fourth embodiment. Instead of the flowchart described in FIG. 19, the flowchart illustrated in FIG. 20 can be applied. In FIG. 20, the same step numbers are attached to the processes that are the same as or similar to that in the flowchart described in FIG. 19, and the description is omitted.

In the flowchart illustrated in FIG. 20, a process of step S18A is provided instead of step S18 in FIG. 19. Step S18A is the process of determining whether or not the threshold non-set pixel is the dot priority pixel. As a method of determining that the threshold non-set pixel under consideration is the dot priority pixel, for example, the already described "conditional expression 1" can be utilized. That is, only in the case that the conditional expression 1 is satisfied, it can be determined as the dot priority pixel.

In the flowchart illustrated in FIG. 20, for a certain threshold A, step S18 in FIG. 19 is omitted, and in step S18A, whether or not the threshold non-set pixel is the dot priority pixel is determined. "A" of the threshold A is an arbitrary value from 1 to the dither mask size.

For the pixel determined as the dot priority pixel in step S18A, the process advances to step S20, the threshold is temporarily set, and the graininess is evaluated. Then, the process advances to step S22.

In the case that the pixel is not determined as the dot priority pixel in step S18A, step S20 is skipped, and the process advances to step S22. In step S22, whether or not the evaluation is completed for the entire candidate pixels which are the candidates of the pixels to set the threshold is determined. The entire candidate pixels here are a set of the threshold non-set pixels.

Determining the pixel as the dot priority pixel in step S18A corresponds to "setting dot priority pixel". Also, the pixel determined as the dot priority pixel in step S18A corresponds to "pixel set to dot priority pixel". Step S18A corresponds to one form of "dot priority pixel setting process".

Then, in step S24, the threshold A is set to the pixel of the best graininess among all the dot priority pixels set in step S20.

Thereafter, in the case that the number of thresholds does not reach the predetermined number yet in step S26, the process returns to step S18A, and the process from step S18A to step S26 is repeated for the next threshold A+1.

Here, it is conceivable that the dot priority pixel tentatively set in step S18A for the threshold A is to be held as the dot priority pixel even for the next threshold A+1, however, for the next threshold A+1, the dot priority pixel is determined again in step S18A. That is, since the dot priority pixels are changed to the new ones before the thresholds are set to all the dot priority pixels tentatively set in step S18A for the threshold A, it is in the concept of "changing dot priority pixels".

[Another Modification]

While the process returns to step S18 and the dot priority pixels are changed every time one threshold is set in step S24 in the flowchart in FIG. 19, without being limited to such a form, the dot priority pixels may be changed every time the plurality of thresholds are set.

Fifth Embodiment

While the example in the case that the path number in the main scanning direction is "1" is described in the first embodiment to the fourth embodiment, the same method can be applied even in the case that the path number is 2 or larger. An example in the case that the path number is 2 is referred to as the fifth embodiment. In the fifth embodiment, in order to simplify the description, an example of using a recording head for which the number of the nozzles is 10 is described.

Figure 21:
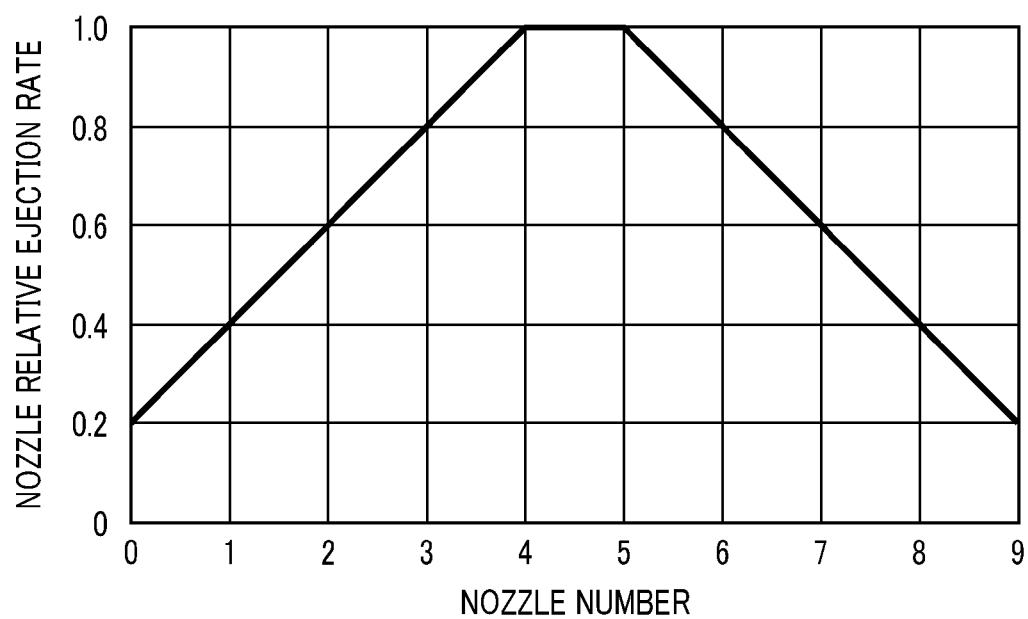
FIG. 21 is an example of nozzle relative ejection rates of individual nozzles in a fifth embodiment.

FIG. 21 is an example of the nozzle relative ejection rates of the individual nozzles in the fifth embodiment. The horizontal axis in FIG. 21 indicates the nozzle number, and the vertical axis indicates the nozzle relative ejection rate. The nozzle relative ejection rate illustrated in FIG. 21 is the one of the stage 1, for example.

Figure 22:
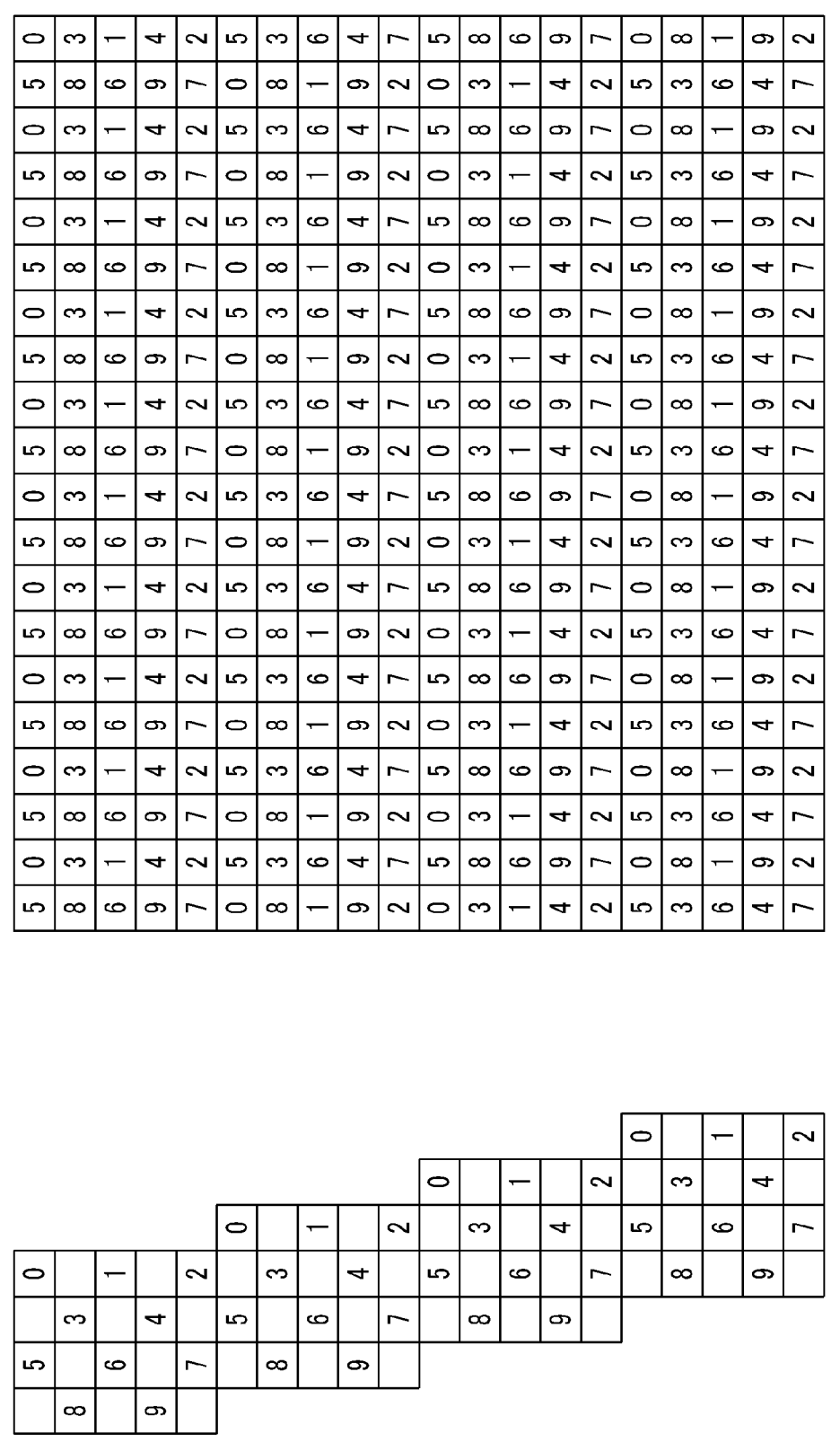

FIG. 22 is an example of the nozzle pattern. FIG. 22 illustrates the nozzle pattern corresponding to the dither mask of 20×20 pixels in the case that the recording resolution is 600×600 dpi, the nozzle array density is 300 npi, the number of nozzles is 10, the paper feed amount is 5/600 dpi, and the path number in the main scanning direction is 2. Rules of notation are similar to the example in FIG. 13. On a left side of FIG. 22, the scanning pattern is schematically illustrated.

As illustrated in FIG. 22, in the case that the path number in the main scanning direction is 2, in the nozzle pattern corresponding to the dither mask of 20×20 pixels, the nozzles to be used are different in odd-numbered columns and even-numbered columns. Hereinafter, for the convenience of the description, the nozzles used for the recording of the odd-numbered columns (the first column, the third column, the fifth column . . . the 19th column from the left in FIG. 22) are referred to as "left nozzles", and the nozzles used for the recording of the even-numbered columns (the second column, the fourth column, the sixth column . . . the 20th column from the left in FIG. 22) are referred to as "right nozzles".

FIG. 23 illustrates an example of the arrangement of the dot priority pixels set based on the nozzle relative ejection rate illustrated in FIG. 21 and the nozzle pattern illustrated in FIG. 22.

"Left nozzle relative ejection rate" in FIG. 23 means the nozzle relative ejection rates of the individual nozzles that record the pixels belonging to the odd-numbered columns in the nozzle pattern corresponding to the dither mask of 20×20 pixels illustrated in FIG. 22. Also, "right nozzle relative ejection rate" in FIG. 23 means the nozzle relative ejection rates of the individual nozzles that record the pixels belonging to the even-numbered columns in the same nozzle pattern.

"Number of left nozzle priority pixels" means the number of dot priority pixels within the main scanning direction raster including the pixels belonging to the odd-numbered columns in the nozzle pattern corresponding to the dither mask of 20×20 pixels illustrated in FIG. 22. "Number of right nozzle priority pixels" means the number of dot priority pixels within the main scanning direction raster including the pixels belonging to the even-numbered columns in the nozzle pattern corresponding to the dither mask of 20×20 pixels illustrated in FIG. 22.

For example, the number of left nozzle priority pixels of the first row is calculated as left nozzle relative ejection rate×number of main scanning pixels/main scanning direction path number=1×20/2=10. Also, the number of right nozzle priority pixels of the first row is calculated as right nozzle relative ejection rate×number of main scanning pixels/main scanning direction path number=0.2×20/2=2.

A method similar to the method described in the first embodiment to the fourth embodiment can be applied also in the case that the main scanning direction path number is 2 or larger.

<Specific Example in the Case of Regularly Setting Dot Priority Pixels>

Here, the method described in "third example of setting method of dot priority pixels" is applied to the example in FIG. 22 and described. In FIG. 22, since the nozzle relative ejection rate is 0.4 for the left nozzles of the raster of the second row for example, the dot priority pixels are to be set to the pixels of the numbers for which the value of the integral multiple of 1/0.4=2.5 is rounded to the integer value. Here in FIG. 22, since the main scanning direction path number is 2, "1" of the ejection pixel interval corresponds to two pixels. Therefore, in the case that the rounding method of the integer value is rounding-off, the dot priority pixels are to be set to the fifth, ninth, 15th and 19th pixels (the pixels of the numbers corresponding to 3, 5, 8 and 10 for which 2.5, 5, 7.5 band 10 are rounded to the integer value respectively) with the pixel at a left end as the first. Also, since the nozzle relative ejection rate is 0.8 for the right nozzles of the raster of the second row, the dot priority pixels are to be set to the pixels of the numbers for which the value of the integral multiple of 1/0.8=1.25 is rounded to the integer value. That is, in the case that the rounding method of the integer value is rounding-off, the dot priority pixels are to be set to the second, sixth, eighth, 10th, 12th, 16th, 18th and 20th pixels (the pixels of the numbers corresponding to 1, 3, 4, 5, 6, 8, 9 and 10 for which 1.25, 2.5, 3.75, 5, 6.25, 7.5, 8.75 and 10 are rounded to the integer value respectively).

[Comparison Between Conventional Method and Method of the Present Invention]

Figure 24:
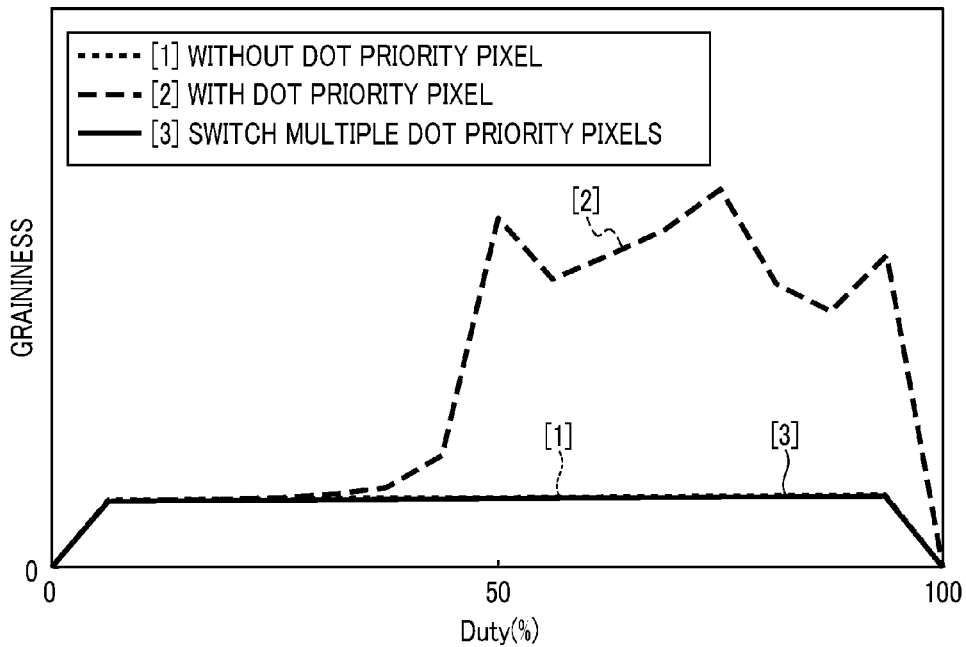
FIG. 24 is a graph illustrating graininess of a dither mask generated by applying the present invention and graininess of a dither mask generated by a conventional method in comparison.

FIG. 24 is a graph illustrating the graininess of the dither mask generated by applying the present invention and the graininess of the dither mask generated by a conventional method in comparison. The horizontal axis of FIG. 24 indicates the duty, and the vertical axis indicates an evaluation value of the graininess. A graph [1] illustrated by a dotted line in FIG. 24 is the graph illustrating the graininess of the dither mask generated without setting the dot priority pixels. The graph [2] illustrated by a broken line in FIG. 24 is the graph illustrating the graininess in the case of setting the dot priority pixels and generating the dither mask without changing the set dot priority pixels. A graph [3] illustrated by a solid line in FIG. 24 illustrates the graininess of the dither mask generated by applying the present invention.

In the graph [2] in which the conventional method is applied, the dot priority pixel of duty 50% is randomly set, and the graininess is substantially deteriorated as the duty approaches 50%. In the area with duty 50% or more in the graph [2], the dot priority pixel is increased stepwise, at the same time the state in which the graininess is deteriorated is continued as the degree of freedom of arrangement of the threshold is decreased due to the dot priority pixel in each stage.

In the graph [2] for which the dot priority pixels are set, the graininess is substantially deteriorated compared to the graph [1] in the case of freely determining the arrangement of the dots without setting the dot priority pixels.

In contrast, the dither mask (graph [3]) generated by applying the present invention maintains the excellent graininess in the entire duty area equally to the graph [1].

Figure 25:
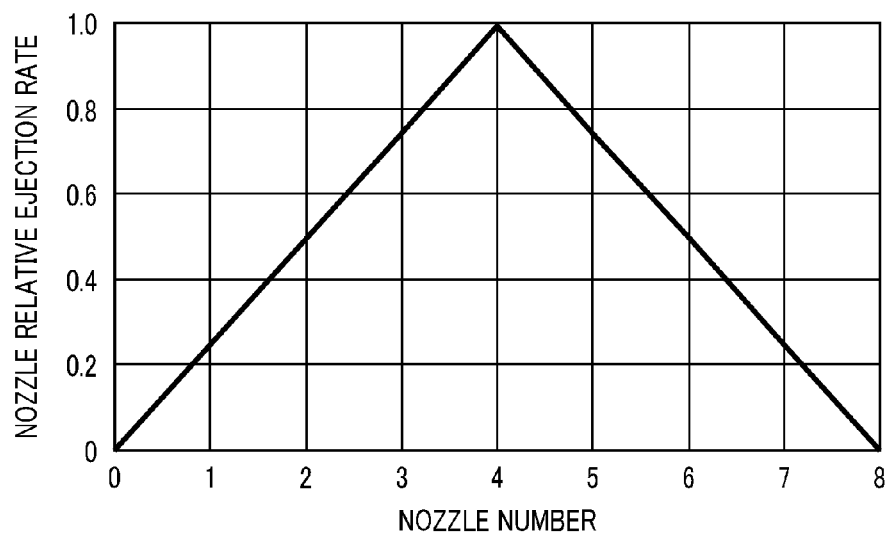
FIG. 25 is a diagram illustrating an example of the nozzle relative ejection rate used when generating the dither mask illustrated in the graph of FIG. 24.

FIG. 25 is an example of the nozzle relative ejection rate used when generating the dither mask illustrated by the graph [3] in FIG. 24. The nozzle relative ejection rates of the individual nozzles illustrated in FIG. 25 are applied for the area of the duty 50% or lower.

As is clear from the graph [2] in FIG. 24, the graininess suddenly starts to get deteriorated from around the duty 40% before the duty 50%.

In contrast, according to the embodiments of the present invention, since the dot priority pixels are changed in the duty area before the graininess suddenly gets deteriorated and the degree of freedom of the dot arrangement is increased, the excellent graininess is maintained.

According to the embodiments of the present invention, it is possible to generate the dither mask that can improve the graininess compared to a conventional method.

[Another Modification 1]

In the first embodiment to the fifth embodiment, as the inkjet recording device, the example of the wide format printer that uses the ultraviolet curing type ink is described, however, the present invention can be applied not only to the one that uses the ultraviolet curing type ink but also to various kinds of inkjet recording devices that record images on the recording medium using various kinds of ink.

In the first embodiment to the fifth embodiment, in order to suppress banding generated when the image is recorded by the multipath type (serial type) recording head, the nozzle relative ejection rates of the nozzles at both ends of the nozzle array are set lower than the nozzle relative ejection rate of the nozzle at the center part of the nozzle array, however, the nozzle relative ejection rates of the individual nozzles may be appropriately changed according to the kind, recording system or the like of the recording head.

[Another Modification 2]

As exemplified in FIG. 16 and FIG. 23, in the individual embodiments described above, the nozzle relative ejection rates of the individual nozzles are set and the dot priority pixels of the individual rasters are set from the nozzle relative ejection rates, however, when implementing the invention, instead of the configuration of setting the nozzle relative ejection rates, the ratio or the number of dot priority pixels to be the candidates of the pixels to set the threshold among the pixels for which the respective nozzles are in charge of the recording may be set for the individual nozzles in charge of the recording of the individual pixels in the dither mask.

For example, the number of dot priority pixels illustrated in FIG. 16 and the number of left nozzle priority pixels and the number of right nozzle priority pixels illustrated in FIG. 23 are the number of dot priority pixels in the recording attending pixels of the individual nozzles, and correspond to one form of "priority pixel setting rate".

[Another Modification 3]

Also, in the first embodiment to the fifth embodiment, the example of the inkjet recording device having the serial type recording head is described, however, upon applying the invention, the inkjet recording device to be a target is not limited to the serial type. The present invention can be applied also to the inkjet recording device having a single path type recording head.

That is, the problem to be solved by the invention is associated not only with a serial type inkjet printer but also with a single path type inkjet printer using a line head. Many line heads are configured by combining a plurality of head modules in the main scanning direction. In the case of using the line head having such a structure, on an end of the head module corresponding to a part of a joint of the individual head modules, a superimposing area of the nozzle group overlapping with a recording area of the nozzle array of another head module is provided.

Due to a difference in characteristics of the individual head modules configuring the line head, there are cases that stripes or irregularity is generated in the superimposing area at a joint part or density irregularity is generated in a cycle of a main scanning direction length of the head module. The problem like this is similar to "banding" explained for a serial type inkjet printer at a point that stripe or belt-like density irregularity is generated. The term "banding" in the present specification is used for an inclusive meaning including not only the density irregularity by the serial type inkjet printer but also the density irregularity by a single path type inkjet printer.

Sixth Embodiment

FIG. 26A is a schematic diagram of a single path type recording head 300. FIG. 26B is a graph illustrating the nozzle relative ejection rates of the individual nozzles 62 of the recording head 300.

The single path type recording head 300 is a line head having a structure for which a plurality of head modules HA, HB and HC are connected in the main scanning direction. In FIGS. 26A and 26B, for the individual head modules HA, HB and HC, the number of the nozzles 62 configuring the nozzle array in the main scanning direction is defined as "20", however, the number of the nozzles and an array form of the nozzles 62 are not limited to this example.

The recording head 300 is provided with the superimposing area of the nozzle array in order to smooth joints of the plurality of head modules HA, HB and HC and to make the error of a dot forming position and an ejection amount generated at the ends of the individual head modules HA, HB and HC inconspicuous.

That is, as illustrated in FIG. 26A, the recording head 300 is provided with the superimposing area of the head module HA and the head module HB, and the superimposing area of the head module HB and the head module HC. In the individual superimposing areas, the dots are formed by alternately using the nozzles 62 of the head module HA and the head module HB, and the head module HB and the head module HC in the sub scanning direction.

However, due to the difference in the nozzle position and the ejection amount between the head module HA and the head module HB, and the head module HB and the head module HC, image defects such as stripes and irregularity in the superimposing areas or the density irregularity in the individual head module cycles are generated.

For this problem, as illustrated in FIG. 26B, in the superimposing area, the nozzle relative ejection rate is set smaller near the nozzle 62 at the end of the head module. Then, when the dither mask is generated, the nozzle relative ejection rate illustrated in FIG. 26B is reflected and the threshold is determined.

For the specific dither mask generation method, the method similar to the method described in the first embodiment to the fifth embodiment can be used.

Using the dither mask obtained in this way, the halftone processing of the image data for printing is performed, and the ejection of the individual nozzles of the recording head 300 is controlled on the basis of the generated halftone image. Thus, generation of the image defects such as the stripes and the irregularity can be suppressed.

<About Program that Makes Computer Function as Dither Mask Generation Device>

It is possible to record a program for making a computer function as a device that generates a dither mask by the dither mask generation method described in the embodiments described above in a computer readable medium (a non-temporary information storage medium that is a tangible object) such as a CD-ROM (Compact Disc read-only memory) or a magnetic disk, and provide the program through the information storage medium. Instead of such a form of storing and providing the program in the information storage medium, it is also possible to provide a program signal as a downloading service by utilizing a communication network like the Internet.

Also, it is also possible to provide the function of the dither mask generation device as an application server and perform a service of providing the processing function through the communication network.

Further, by incorporating the program in a computer, the computer can be made to achieve the individual functions of the dither mask generation device, and the dither mask generation function described in the above-described embodiments can be achieved.

Also, a form of incorporating some or all of the program for achieving printing control including the dither mask generation function described in the present embodiments in a high-order controller such as a host computer, and application as an operation program of a central processing unit (CPU) on an inkjet recording device side are also possible.

Advantages of Embodiments

According to the embodiments of the present invention, it is possible to generate the dither mask that can improve the graininess compared to a conventional method.

By performing halftone processing using the dither mask obtained by the present embodiments, and controlling the ejection of the ink based on the obtained halftone images, excellent images for which banding is suppressed can be formed.

[Others]

While an object is to suppress banding, stripes or irregularity due to density change in the above embodiment, banding, stripes or irregularity due to gloss change is similarly generated in the inkjet recording device, and the present invention is effective also for this problem. Also, the present invention is similarly effective for banding, stripes or irregularity by the change of a dot pattern.

For the embodiment of the present invention described above, without departing from the scope of the invention, components can be appropriately changed, added or deleted. The present invention is not limited to the embodiment described above, and many modifications are possible by persons skilled in the art within the technical idea of the present invention.

What is claimed is:

1. A dither mask generation method that generates a dither mask used in halftone processing for recording an image by a recording head having a plurality of nozzles that eject ink, the method comprising:
    a nozzle pattern setting process of setting a nozzle pattern indicating correspondence relation between individual pixels of the dither mask and the nozzles in charge of recording of respective pixel positions;
    a dot priority pixel setting process of setting dot priority pixels to be candidates to which a threshold is to be set among the pixels of the dither mask, based on the nozzle pattern;
    a threshold setting process of setting the threshold to the pixel belonging to the dot priority pixels;
    a process of changing the dot priority pixels before the threshold is set to each of all the dot priority pixels that are tentatively set by the dot priority pixel setting process regarding at least one of the thresholds set in the threshold setting process,
    wherein, by changing the dot priority pixels before the threshold is set, graininess of the dither mask is decreased; and
    recording the image by the recording head having the plurality of nozzles that eject ink using the generated dither mask having decreased graininess.

2. The dither mask generation method according to claim 1, comprising
    a priority pixel setting rate setting process of setting a priority pixel setting rate that indicates a ratio of the dot priority pixels in recording attending pixels allocated to each nozzle as pixels for which each of the plurality of nozzles is in charge of recording among the pixels of the dither mask,
    wherein in the dot priority pixel setting process, the dot priority pixels are set based on the nozzle pattern and the priority pixel setting rate for each nozzle.

3. The dither mask generation method according to claim 2,
    wherein setting of the priority pixel setting rate for each nozzle set by the priority pixel setting rate setting process is changed in a plurality of stages, at least two stages, by a value of the threshold set by the threshold setting process.

4. The dither mask generation method according to claim 3, wherein, when a maximum value of a value that the priority pixel setting rate can take is 1.0, the priority pixel setting rates of all the nozzles are 1.0 in the final stage of the plurality of stages.

5. The dither mask generation method according to claim 3,
wherein one kind of the dot priority pixels is set to setting of the priority pixel setting rate of the same stage by the dot priority pixel setting process.

6. The dither mask generation method according to claim 3,
wherein a plurality of different kinds of the dot priority pixels are switched and set to setting of the priority pixel setting rate of the same stage by the dot priority pixel setting process.

7. The dither mask generation method according to claim 3,
wherein the number of the thresholds to be set under the setting of the priority pixel setting rate of the same stage is determined, and
wherein, when the setting of the determined number of the thresholds is completed, change to the setting of the priority pixel setting rate of a different stage is performed.

8. The dither mask generation method according to claim 1,
wherein in the dot priority pixel setting process, the dot priority pixels are set using a random number, based on the priority pixel setting rate for each nozzle.

9. The dither mask generation method according to claim 1,
wherein in the dot priority pixel setting process, the dot priority pixels are set based on the pixels of the thresholds that are already set.

10. The dither mask generation method according to claim 9,
wherein in the dot priority pixel setting process, the pixels other than the pixels of the thresholds that are already set are set to the dot priority pixels.

11. The dither mask generation method according to claim 1,
wherein the dot priority pixel setting process includes a process of determining whether or not the pixel to which the threshold is not set is the dot priority pixel.

12. The dither mask generation method according to claim 1,
wherein the recording head has a nozzle array formed by arraying the nozzles in a sub scanning direction that is parallel to a conveying direction of a recording medium, and is a serial type recording head that records an image on the recording medium while moving in a main scanning direction that is a width direction of the recording medium which intersects with the sub scanning direction.

13. The dither mask generation method according to claim 12,
wherein, regarding the priority pixel setting rate that indicates the ratio of the dot priority pixels in the recording attending pixels allocated to each nozzle as the pixels for which each of the plurality of nozzles is in charge of recording among the pixels of the dither mask, the dot priority pixels are set such that the priority pixel setting rate of the nozzle arranged at an end of the nozzle array becomes a value smaller than the priority pixel setting rate of the nozzle arranged at a center part of the nozzle array.

14. A dither mask generation device that generates a dither mask used in halftone processing for recording an image by a recording head having a plurality of nozzles that eject ink, the device comprising at least one processor having:
a nozzle pattern setting process unit configured to set a nozzle pattern indicating correspondence relation between individual pixels of the dither mask and the nozzles in charge of recording of respective pixel positions;
a dot priority pixel setting process unit configured to set dot priority pixels to be candidates to which a threshold is to be set among the pixels of the dither mask, based on the nozzle pattern; and
a threshold setting process unit configured to set the threshold to the pixel belonging to the dot priority pixels,
wherein the dot priority pixel setting process unit changes the dot priority pixels before the threshold is set to all the dot priority pixels that are tentatively set, regarding at least one of the thresholds,
wherein, by changing the dot priority pixels before the threshold is set, graininess of the dither mask is decreased, and
wherein the image recorded by the recording head having the plurality of nozzles that eject ink is recorded using the generated dither mask having decreased graininess.

15. A non-transitory computer-readable recording medium which stores a program for making a computer achieve a function of generating a dither mask used in halftone processing for recording an image by a recording head having a plurality of nozzles that eject ink, such that when the program is read and executed by the computer, the computer is configured to perform:
a nozzle pattern setting function of setting a nozzle pattern indicating correspondence relation between individual pixels of the dither mask and the nozzles in charge of recording of respective pixel positions;
a dot priority pixel setting function of setting dot priority pixels to be candidates to which a threshold is to be set among the pixels of the dither mask, based on the nozzle pattern;
a threshold setting function of setting the threshold to the pixel belonging to the dot priority pixels; and
a function of changing the dot priority pixels before the threshold is set to all the dot priority pixels that are tentatively set by the dot priority pixel setting function, regarding at least one of the thresholds,
wherein, by changing the dot priority pixels before the threshold is set, graininess of the dither mask is decreased, and
wherein the image recorded by the recording head having the plurality of nozzles that eject ink is recorded using the generated dither mask having decreased graininess.

* * * * *